US012192789B2

(12) United States Patent
Sakhnini et al.

(10) Patent No.: US 12,192,789 B2
(45) Date of Patent: Jan. 7, 2025

(54) BEAM MANAGEMENT USING A DEDICATED PHYSICAL LAYER CHANNEL

(71) Applicant: QUALCOMM Incorporated, San Diego, CA (US)

(72) Inventors: Iyab Issam Sakhnini, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 362 days.

(21) Appl. No.: 17/870,390

(22) Filed: Jul. 21, 2022

(65) Prior Publication Data
US 2024/0031825 A1    Jan. 25, 2024

(51) Int. Cl.
*H04W 16/28*    (2009.01)
*H04W 72/1263*    (2023.01)
*H04W 72/23*    (2023.01)

(52) U.S. Cl.
CPC ....... *H04W 16/28* (2013.01); *H04W 72/1263* (2013.01); *H04W 72/23* (2023.01)

(58) Field of Classification Search
None
See application file for complete search history.

(56) References Cited

U.S. PATENT DOCUMENTS 11,611,468 B2 * 3/2023 Zhou .................. H04W 76/19
2019/0394664 A1 * 12/2019 Sun ..................... H04W 24/02

* cited by examiner

*Primary Examiner* — Hong S Cho
(74) *Attorney, Agent, or Firm* — Holland & Hart LLP

(57) ABSTRACT

Methods, systems, and devices for wireless communications are described. A network node may transmit a control message identifying a configuration for a physical layer channel that is dedicated to carrying beam management information for communications with a user equipment (UE). The network node may transmit an indication of beam management parameters to one or more UEs via the physical layer channel that is dedicated to carrying beam management information. The UE may perform a beam management procedure using the one or more beam management parameters, such as identifying one or more beams for communications with the network node. The UE and the network node may communicate uplink signaling, downlink signaling, or both using the identified one or more beams.

30 Claims, 16 Drawing Sheets

BEAM MANAGEMENT USING A DEDICATED PHYSICAL LAYER CHANNEL

FIELD OF TECHNOLOGY

The present disclosure relates to wireless communications, including beam management using a dedicated physical layer channel.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

In some cases, one or more devices (e.g., a network node, a UE) operating within a wireless communications system may perform communications via one or more spatial resources (e.g., beams).

SUMMARY

The described techniques relate to improved methods, systems, devices, and apparatuses that support beam management using a dedicated physical layer channel. For example, the described techniques provide for a network node to configure one or more user equipment (UEs) with a physical layer channel dedicated to beam management information to reduce or mitigate time and power spent decoding control messages including additional information other than the beam management information. For example, a UE may receive a control message identifying a configuration (a periodic configuration, a semi-persistent configuration, an aperiodic configuration, a configuration in response to a request from the UE, etc.) for the physical layer channel dedicated to beam management information. In some cases, the UE may receive beam management parameters for performing a beam management procedure (e.g., switching beams) via the physical layer channel dedicated to the beam management information. That is, the UE may use the beam management parameters to identify a beam (e.g., a transmit beam or a receive beam) for communications with a network node. The UE may perform a beam management procedure to switch to the identified beam, and may communicate uplink or downlink signaling with the network node using the new beam.

A method for wireless communication at a user equipment (UE) is described. The method may include receiving, via a first physical layer channel, a control message identifying a configuration for a second physical layer channel dedicated to beam management information, receiving, via the second physical layer channel dedicated to the beam management information according to the configuration, an indication of one or more beam management parameters for the UE to use to identify a first beam for communications with a network entity, and communicating with the network entity using the first beam identified by the UE in accordance with the one or more beam management parameters received via the second physical layer channel dedicated to the beam management information.

An apparatus for wireless communication at a UE is described. The apparatus may include a processor, memory coupled with the processor, and instructions stored in the memory. The instructions may be executable by the processor to cause the apparatus to receive, via a first physical layer channel, a control message identifying a configuration for a second physical layer channel dedicated to beam management information, receive, via the second physical layer channel dedicated to the beam management information according to the configuration, an indication of one or more beam management parameters for the UE to use to identify a first beam for communications with a network entity, and communicate with the network entity using the first beam identified by the UE in accordance with the one or more beam management parameters received via the second physical layer channel dedicated to the beam management information.

Another apparatus for wireless communication at a UE is described. The apparatus may include means for receiving, via a first physical layer channel, a control message identifying a configuration for a second physical layer channel dedicated to beam management information, means for receiving, via the second physical layer channel dedicated to the beam management information according to the configuration, an indication of one or more beam management parameters for the UE to use to identify a first beam for communications with a network entity, and means for communicating with the network entity using the first beam identified by the UE in accordance with the one or more beam management parameters received via the second physical layer channel dedicated to the beam management information.

A non-transitory computer-readable medium storing code for wireless communication at a UE is described. The code may include instructions executable by a processor to receive, via a first physical layer channel, a control message identifying a configuration for a second physical layer channel dedicated to beam management information, receive, via the second physical layer channel dedicated to the beam management information according to the configuration, an indication of one or more beam management parameters for the UE to use to identify a first beam for communications with a network entity, and communicate with the network entity using the first beam identified by the UE in accordance with the one or more beam management parameters received via the second physical layer channel dedicated to the beam management information.

In some examples of the method, apparatuses, and non-transitory computer-readable medium described herein, receiving the indication of the one or more beam management parameters may include operations, features, means, or instructions for receiving a downlink control information (DCI) message identifying the one or more beam management parameters.

In some examples of the method, apparatuses, and non-transitory computer-readable medium described herein, the DCI message may be of a first DCI format type for beam management and shares a control resource set (CORESET)

or a synchronization signal set with at least a second DCI format type different from the first DCI format type.

In some examples of the method, apparatuses, and non-transitory computer-readable medium described herein, the DCI message may be received via a CORESET or a synchronization signal set dedicated to communicating a first DCI format type for beam management.

In some examples of the method, apparatuses, and non-transitory computer-readable medium described herein, receiving the indication of the one or more beam management parameters may include operations, features, means, or instructions for receiving a sequence-based non-coherent signal that corresponds to the one or more beam management parameters.

In some examples of the method, apparatuses, and non-transitory computer-readable medium described herein, the sequence-based non-coherent signal may be associated with different reference signal properties, may be received according to ON/OFF keying, corresponds to a type of index modulation, or any combination thereof.

In some examples of the method, apparatuses, and non-transitory computer-readable medium described herein, the configuration for the second physical layer channel dedicated to the beam management information may include operations, features, means, or instructions for an indication of a periodic set of time-frequency resources for the second physical layer channel, an indication of a semi-persistently scheduled set of time-frequency resources for the second physical layer channel, where the UE receives the indication of the one or more beam management parameters via the second physical layer channel in response to a grant identifying resources of the semi-persistently scheduled set of time-frequency resources, a grant of downlink time-frequency resources for the UE to use to receive the second physical layer channel, a grant of downlink time-frequency resources for the UE to use to receive the second physical layer channel responsive to a request for the one or more beam management parameters transmitted to the network entity by the UE, and any combination thereof.

Some examples of the method, apparatuses, and non-transitory computer-readable medium described herein may further include operations, features, means, or instructions for transmitting a feedback message identifying that the UE may have successfully received the indication of the one or more beam management parameters.

In some examples of the method, apparatuses, and non-transitory computer-readable medium described herein, receiving the control message identifying the configuration may include operations, features, means, or instructions for receiving an indication of a time threshold associated with an offset to the communications with the network entity, where the configuration includes the time threshold.

Some examples of the method, apparatuses, and non-transitory computer-readable medium described herein may further include operations, features, means, or instructions for transmitting a receiver capability of the UE, where the time threshold may be received at least in part in response to the transmitted receiver capability.

Some examples of the method, apparatuses, and non-transitory computer-readable medium described herein may further include operations, features, means, or instructions for receiving, prior to receiving the control message, a message indicating a second beam for receiving the indication of the one or more beam management parameters.

In some examples of the method, apparatuses, and non-transitory computer-readable medium described herein, the one or more beam management parameters include a transmission configuration indicator (TCI) state corresponding to one or more third physical layer channels, a spatial relation corresponding to the one or more third physical layer channels, a first flag activating or deactivating the TCI state, a trigger for an aperiodic reference signal transmission, a second flag activating or deactivating a semi-persistent reference signal transmission, or any combination thereof.

In some examples of the method, apparatuses, and non-transitory computer-readable medium described herein, the communicating with the network entity may include operations, features, means, or instructions for transmitting, using the first beam, one or more uplink messages to the network entity, receiving, using the first beam, one or more downlink messages from the network entity, and any combination thereof.

A method for wireless communication at a network entity is described. The method may include transmitting, via a first physical layer channel, a control message identifying a configuration for a second physical layer channel dedicated to beam management information, transmitting, via the second physical layer channel dedicated to the beam management information according to the configuration, an indication of one or more beam management parameters for one or more user equipments (UEs) to use to identify a first beam for communications with the network entity, and communicating with the one or more UEs based on transmitting the indication of the one or more beam management parameters transmitted via the second physical layer channel dedicated to the beam management information.

An apparatus for wireless communication at a network entity is described. The apparatus may include a processor, memory coupled with the processor, and instructions stored in the memory. The instructions may be executable by the processor to cause the apparatus to transmit, via a first physical layer channel, a control message identifying a configuration for a second physical layer channel dedicated to beam management information, transmit, via the second physical layer channel dedicated to the beam management information according to the configuration, an indication of one or more beam management parameters for one or more user equipments (UEs) to use to identify a first beam for communications with the network entity, and communicate with the one or more UEs based on transmitting the indication of the one or more beam management parameters transmitted via the second physical layer channel dedicated to the beam management information.

Another apparatus for wireless communication at a network entity is described. The apparatus may include means for transmitting, via a first physical layer channel, a control message identifying a configuration for a second physical layer channel dedicated to beam management information, means for transmitting, via the second physical layer channel dedicated to the beam management information according to the configuration, an indication of one or more beam management parameters for one or more user equipments (UEs) to use to identify a first beam for communications with the network entity, and means for communicating with the one or more UEs based on transmitting the indication of the one or more beam management parameters transmitted via the second physical layer channel dedicated to the beam management information.

A non-transitory computer-readable medium storing code for wireless communication at a network entity is described. The code may include instructions executable by a processor to transmit, via a first physical layer channel, a control message identifying a configuration for a second physical layer channel dedicated to beam management information, transmit, via the second physical layer channel dedicated to the beam management information according to the configuration, an indication of one or more beam management parameters for one or more user equipments (UEs) to use to identify a first beam for communications with the network entity, and communicate with the one or more UEs based on transmitting the indication of the one or more beam management parameters transmitted via the second physical layer channel dedicated to the beam management information.

In some examples of the method, apparatuses, and non-transitory computer-readable medium described herein, transmitting the control message identifying the configuration may include operations, features, means, or instructions for transmitting an indication of a time threshold associated with an offset to the communications with the one or more UEs, where the configuration includes the time threshold.

In some examples of the method, apparatuses, and non-transitory computer-readable medium described herein, the time threshold may be based on a capability of a receiver of the one or more UEs, a third physical layer channel corresponding to the communications, a subcarrier spacing of the indication, a type of signaling carrying the indication, or any combination thereof.

In some examples of the method, apparatuses, and non-transitory computer-readable medium described herein, transmitting the indication of the one or more beam management parameters may include operations, features, means, or instructions for transmitting a DCI message identifying the one or more beam management parameters.

In some examples of the method, apparatuses, and non-transitory computer-readable medium described herein, the DCI message may be of a first DCI format type for beam management and shares a CORESET or a synchronization signal set with at least a second DCI format type different from the first DCI format type.

In some examples of the method, apparatuses, and non-transitory computer-readable medium described herein, the DCI message may be transmitted via a CORESET or a synchronization signal set dedicated to communicating a first DCI format type for beam management.

In some examples of the method, apparatuses, and non-transitory computer-readable medium described herein, transmitting the indication of the one or more beam management parameters may include operations, features, means, or instructions for transmitting a sequence-based non-coherent signal that corresponds to the one or more beam management parameters.

In some examples of the method, apparatuses, and non-transitory computer-readable medium described herein, the sequence-based non-coherent signal may be associated with different reference signal properties, may be transmitted according to ON/OFF keying, corresponds to a type of index modulation, or any combination thereof.

In some examples of the method, apparatuses, and non-transitory computer-readable medium described herein, the configuration for the second physical layer channel dedicated to the beam management information may include operations, features, means, or instructions for an indication of a periodic set of time-frequency resources for the second physical layer channel, an indication of a semi-persistently scheduled set of time-frequency resources for the second physical layer channel, where the network entity transmits the indication of the one or more beam management parameters via the second physical layer channel based on transmitting a grant identifying resources of the semi-persistently scheduled set of time-frequency resources, a grant of downlink time-frequency resources for the one or more UEs to use to receive the second physical layer channel, a grant of downlink time-frequency resources for the one or more UEs to use to receive the second physical layer channel responsive to a request for the one or more beam management parameters received at the network entity from the one or more UEs, and any combination thereof.

In some examples of the method, apparatuses, and non-transitory computer-readable medium described herein may further include operations, features, means, or instructions for receiving a feedback message identifying that the one or more UEs may have successfully received the indication of the one or more beam management parameters.

In some examples of the method, apparatuses, and non-transitory computer-readable medium described herein may further include operations, features, means, or instructions for transmitting, prior to transmitting the control message, a message for the one or more UEs to use to identify a second beam for receiving the indication of the one or more beam management parameters.

In some examples of the method, apparatuses, and non-transitory computer-readable medium described herein, the one or more beam management parameters include a TCI state corresponding to one or more third physical layer channels, a spatial relation corresponding to the one or more third physical layer channels, a first flag activating or deactivating the TCI state, a trigger for an aperiodic reference signal transmission, a second flag activating or deactivating a semi-persistent reference signal transmission, or any combination thereof.

In some examples of the method, apparatuses, and non-transitory computer-readable medium described herein, the communicating with the one or more UEs may include operations, features, means, or instructions for receiving, using the first beam, one or more uplink messages from the one or more UEs, transmitting, using the first beam, one or more downlink messages to the one or more UEs, and any combination thereof.

DETAILED DESCRIPTION

Wireless communication systems may support beam management procedures for selecting a beam for communications between a user equipment (UE) and a network node, which may be a base station. A UE may select one or more beams via which to receive or transmit communications by measuring and comparing channel characteristics using the reference signal resource for each beam, such as a synchronization signal block (SSB), a channel state information reference signal (CSI-RS), or the like. The UE may switch between a current beam and a selected beam, which may incur a beam switching delay. The beam switching delay may include a time for the UE to decode a control message initiating the beam management procedure and a time for the UE to perform the switch once the UE identifies a beam. In some examples, a network node may transmit a control message including a wide array of information, including the indication of the beam management procedure. However, decoding the additional information in the control message may be resource and power inefficient.

As described herein, a network node may define a physical layer channel dedicated to beam management information to reduce or mitigate time and power spent decoding control messages including additional information other than the beam management information. For example, a UE may receive a control message identifying a configuration (a periodic configuration, a semi-persistent configuration, an aperiodic configuration, a configuration in response to a request from the UE, etc.) for the physical layer channel dedicated to beam management information. The physical layer channel may be a coherent channel (e.g., a channel defined for beam management information or a downlink control information (DCI) dedicated to carrying beam management information) or a sequence based non-coherent channel (e.g., indicated by reference signal properties, ON/OFF keying, index modulation, or any combination thereof). The UE may receive beam management parameters for performing a beam management procedure (e.g., switching beams) via the physical layer channel. That is, the UE may use the beam management parameters to identify a beam (e.g., a transmit beam or a receive beam) for communications with a network node. The UE may perform a beam management procedure to switch to the identified beam, and may communicate uplink or downlink signaling with the network node using the new beam.

Aspects of the disclosure are initially described in the context of wireless communications systems. Aspects of the disclosure are further illustrated by and described with reference to process flows, apparatus diagrams, system diagrams, and flowcharts that relate to beam management using a dedicated physical layer channel.

Figure 1:
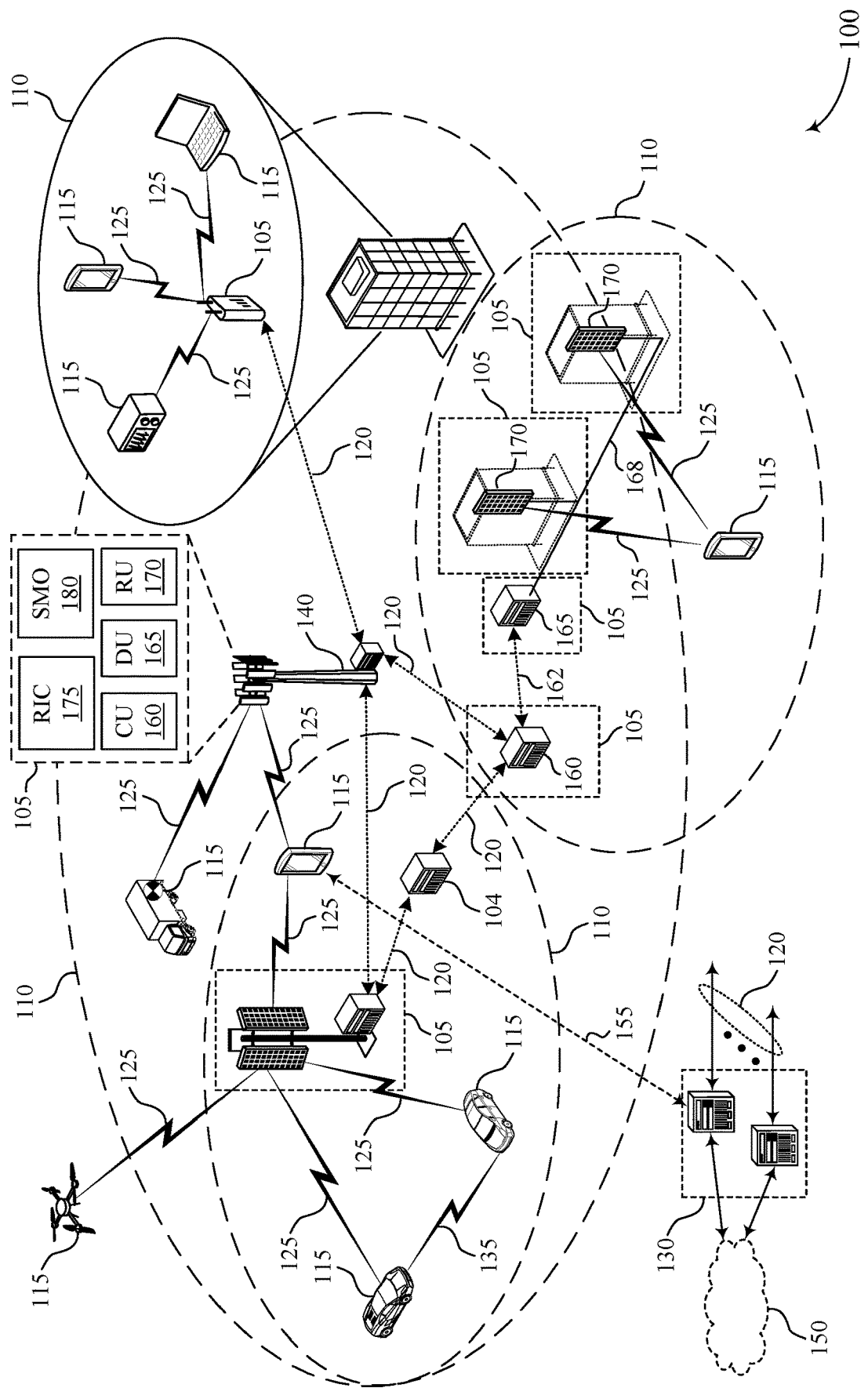
FIG. 1 illustrates an example of a wireless communications system that supports beam management using a dedicated physical layer channel in accordance with one or more aspects of the present disclosure.

FIG. 1 illustrates an example of a wireless communications system 100 that supports beam management using a dedicated physical layer channel in accordance with one or more aspects of the present disclosure. The wireless communications system 100 may include one or more network nodes 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network nodes 105 may be dispersed throughout a geographic area to form the wireless communications system 100 and may include devices in different forms or having different capabilities. In various examples, a network node 105 may be referred to as a network element, a mobility element, a radio access network (RAN) node, or network equipment, among other nomenclature. In some examples, network nodes 105 and UEs 115 may wirelessly communicate via one or more communication links 125 (e.g., a radio frequency (RF) access link). For example, a network node 105 may support a coverage area 110 (e.g., a geographic coverage area) over which the UEs 115 and the network node 105 may establish one or more communication links 125. The coverage area 110 may be an example of a geographic area over which a network node 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network nodes 105, as shown in FIG. 1.

As described herein, a node of the wireless communications system 100, which may be referred to as a network node, or a wireless node, may be a network node 105 (e.g., any network node described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network node 105. As another example, a first node may be configured to communicate with a second node or a third node. In one aspect of this example, the first node may be a UE 115, the second node may be a network node 105, and the third node may be a UE 115. In another aspect of this example, the first node may be a UE 115, the second node may be a network node 105, and the third node may be a network node 105. In yet other aspects of this example, the first, second, and third nodes may be different relative to these examples. Similarly, reference to a UE 115, network node 105, apparatus, device, computing system, or the like may include disclosure of the UE 115, network node 105, apparatus, device, computing system, or the like being a node. For example, disclosure that a UE 115 is configured to receive information from a network node 105 also discloses that a first node is configured to receive information from a second node.

In some examples, network nodes 105 may communicate with the core network 130, or with one another, or both. For example, network nodes 105 may communicate with the core network 130 via one or more backhaul communication links 120 (e.g., in accordance with an S1, N2, N3, or other interface protocol). In some examples, network nodes 105 may communicate with one another via a backhaul communication link 120 (e.g., in accordance with an X2, Xn, or other interface protocol) either directly (e.g., directly between network nodes 105) or indirectly (e.g., via a core network 130). In some examples, network nodes 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network nodes 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network node 105 (e.g., a base station 140) may be implemented in an aggregated (e.g., monolithic, standalone) base station architecture, which may be configured to utilize a protocol stack that is physically or logically integrated within a single network node 105 (e.g., a single RAN node, such as a base station 140).

In some examples, a network node 105 may be implemented in a disaggregated architecture (e.g., a disaggregated base station architecture, a disaggregated RAN architecture), which may be configured to utilize a protocol stack that is physically or logically distributed among two or more network nodes 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network node 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network nodes 105 in a disaggregated RAN architecture may be co-located, or one or more components of the network nodes 105 may be located in distributed locations (e.g., separate physical locations). In some examples, one or more network nodes 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network nodes 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network nodes 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network node 105 (e.g., a donor base station 140). The one or more donor network nodes 105 (e.g., IAB donors) may be in communication with one or more additional network nodes 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115)

within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support beam management using a dedicated physical layer channel as described herein. For example, some operations described as being performed by a UE 115 or a network node 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network nodes 105 and the network equipment including macro eNBs or gNBs, small cell eNBs or gNBs, or relay base stations, among other examples, as shown in FIG. 1.

The UEs 115 and the network nodes 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network node 105 and other devices may refer to communication between the devices and any portion (e.g., entity, sub-entity) of a network node 105. For example, the terms "transmitting," "receiving," or "communicating," when referring to a network node 105, may refer to any portion of a network node 105 (e.g., a base station 140, a CU 160, a DU 165, a RU 170) of a RAN communicating with another device (e.g., directly or via one or more other network nodes 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network node 105 to a UE 115, uplink transmissions (e.g., return link transmissions) from a UE 115 to a network node 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network nodes 105, the UEs 115, or both) may have hardware configurations that support communications using a particular carrier bandwidth or may be configurable to support communications using one of a set of carrier bandwidths. In some examples, the wireless communications system 100 may include network nodes 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing (Δf) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network nodes 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a CORESET) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network node 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network node 105. In some other examples, the overlapping coverage areas 110 associated with different technologies may be supported by different network nodes 105. The wireless communications system 100 may include, for example, a heterogeneous network in which different types of the network nodes 105 provide coverage for various coverage areas 110 using the same or different radio access technologies.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network node 105 (e.g., a base station 140, an RU 170), which may support aspects of such D2D communications being configured by (e.g., scheduled by) the network node 105. In some examples, one or more UEs 115 of such a group may be outside the coverage area 110 of a network node 105 or may be otherwise unable to or not configured to receive transmissions from a network node 105. In some examples, groups of the UEs 115 communicating via D2D communications may support a one-to-many (1:M) system in which each UE 115 transmits to each of the other UEs 115 in the group. In some examples, a network node 105 may facilitate the scheduling of resources for D2D communications. In some other examples, D2D communications may be carried out between the UEs 115 without an involvement of a network node 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network nodes 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network nodes 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network nodes 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network node 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network node 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network node 105 may be located at diverse geographic locations. A network node 105 may include an antenna array with a set of rows and columns of antenna ports that the network node 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network nodes 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network node 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network node 105 or a UE 115 may use beam sweeping techniques as part of beamforming operations. For example, a network node 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network node 105 multiple times along different directions. For example, the network node 105 may transmit a signal according to different beamforming weight sets associated with different directions of transmission. Transmissions along different beam directions may be used to identify (e.g., by a transmitting device, such as a network node 105, or by a receiving device, such as a UE 115) a beam direction for later transmission or reception by the network node 105.

Some signals, such as data signals associated with a particular receiving device, may be transmitted by transmitting device (e.g., a transmitting network node 105, a transmitting UE 115) along a single beam direction (e.g., a direction associated with the receiving device, such as a receiving network node 105 or a receiving UE 115). In some examples, the beam direction associated with transmissions along a single beam direction may be determined based on a signal that was transmitted along one or more beam directions. For example, a UE 115 may receive one or more of the signals transmitted by the network node 105 along different directions and may report to the network node 105 an indication of the signal that the UE 115 received with a highest signal quality or an otherwise acceptable signal quality.

In some examples, transmissions by a device (e.g., by a network node 105 or a UE 115) may be performed using multiple beam directions, and the device may use a combination of digital precoding or beamforming to generate a combined beam for transmission (e.g., from a network node 105 to a UE 115). The UE 115 may report feedback that indicates precoding weights for one or more beam directions, and the feedback may correspond to a configured set of beams across a system bandwidth or one or more subbands. The network node 105 may transmit a reference signal (e.g., a cell-specific reference signal (CRS), a CSI-RS), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network node 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network node 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network node 105 or a core network 130 supporting radio bearers for user plane data. A PHY layer may map transport channels to physical channels.

The UEs 115 and the network nodes 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

In some cases, a wireless communications system (e.g., the wireless communications system 100) may support beam management procedures for selecting a beam for communications between a UE 115 and a network node 105. For example, UE 115 may initiate a beam management procedure (e.g., a beam switch) after receiving a control message (e.g., from the network node 105). In some cases, the UE 115 may experience a delay (e.g., a beam switching delay) which may include a time for the UE 115 to decode the control message and a time for the UE 115 to perform the beam management procedure. However, decoding additional information in the control message may be resource and power inefficient.

In some cases, a network node 105 may define a physical layer channel dedicated to beam management information to reduce or mitigate time, power, or both spent decoding additional information (e.g., unrelated to beam management information) in control messages. For example, a UE 115 may receive a control message (e.g., from the network node 105) identifying a configuration for the physical layer channel (e.g., a coherent channel or a non-coherent channel) dedicated to beam management information. The UE 115 may then receive (e.g., via the channel dedicated to beam management information) an indication of one or more beam management parameters for the UE 115 to use to identify a beam for performing subsequent communications (e.g., uplink communications, downlink communications, or both) with the network node 105.

Figure 2:
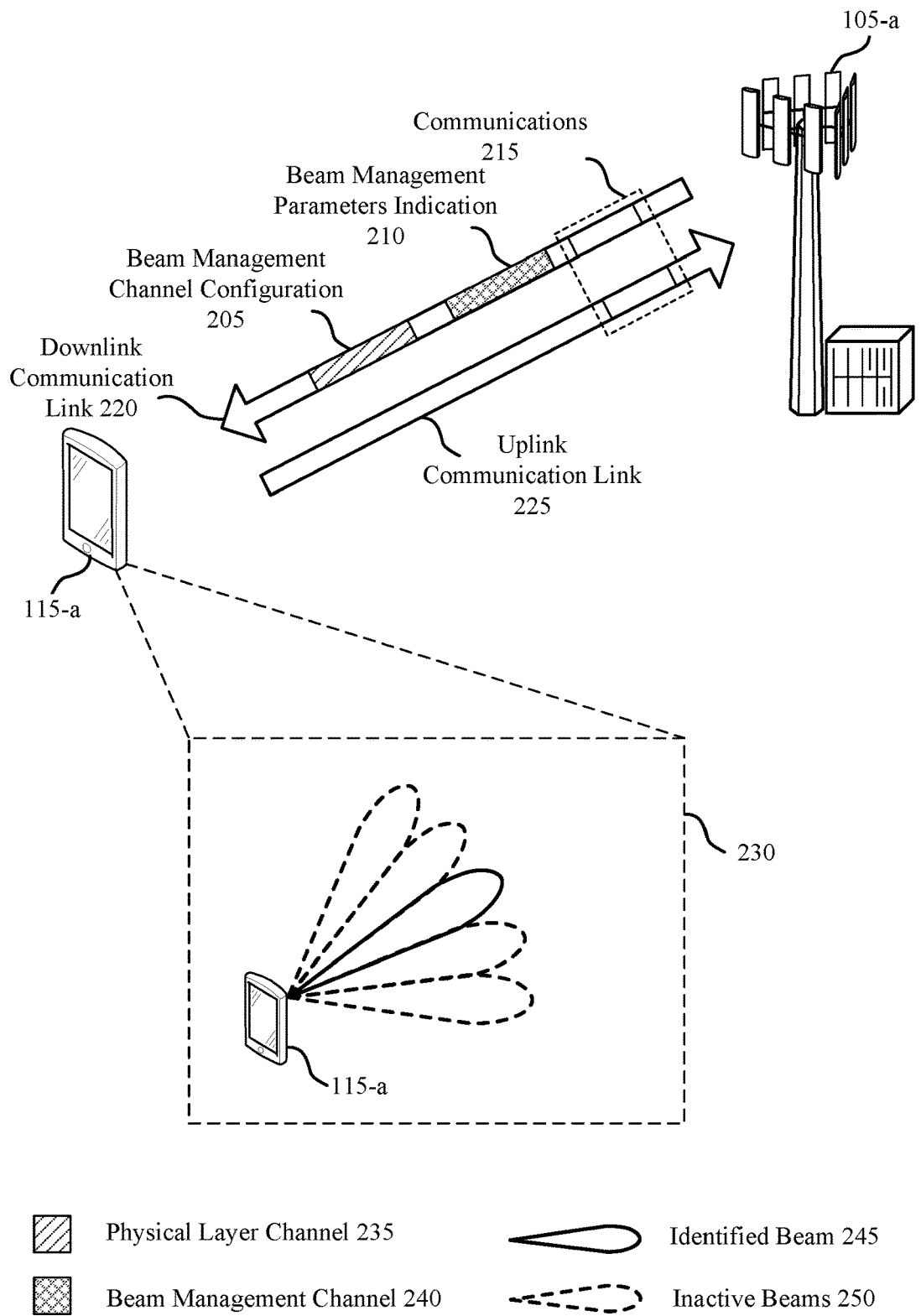
FIG. 2 illustrates an example of a wireless communications system that supports beam management using a dedicated physical layer channel in accordance with one or more aspects of the present disclosure.

FIG. 2 illustrates an example of a wireless communications system 200 that supports beam management using a dedicated physical layer channel in accordance with one or more aspects of the present disclosure. The wireless communications system 200 may include aspects of the wireless communications system 100. For example, the wireless communications system may include a UE 115-a and a network node 105-a, which may be respective examples of a UE 115 and a network node 105 as described with reference to FIG. 1. In some cases, the UE 115-a and the network node 105-b may perform one or more communications (e.g., a beam management channel configuration 205, a beam management parameters indication 210, communications 215, or any combination thereof) via one or more communication links (e.g., a downlink communication link 220 and an uplink communication link 225). In some cases, the UE 115-a may perform a beam identification procedure 230. Additionally, or alternatively, the UE 115-a and the network node 105-a may configure one or more channels (e.g., a physical layer channel 235 or a beam management channel 240) for various operations of the wireless communications system 200. The network node may additionally, or alternatively, be referred to as a network entity.

In some examples, to establish communication between the network node 105-a and the UE 115-a, the UE 115-a and the network node 105-a may perform a beam management procedure (e.g., a set of processes or procedures, including a beam selection procedure, a beam refinement procedure, a beam switching procedure, or any combination thereof) to support beamformed communications. For example, the network node 105-a and the UE 115-a may perform beam sweeping procedures during an initial access, beam measurement and determination procedures during a connected mode, beam reporting procedures during the connected mode (e.g., Layer 1 (L1) report for beam refinement), and beam recovery procedures for a beam failure recovery (BFR) or a radio link failure (RLF). In an initial access procedure, the network node 105-a may transmit in multiple directions (e.g., beams) to synchronize for communication with the UE 115-a. For example, the network node 105-a may transmit a reference signal, such as an SSB, a CSI-RS, or both in a set of directions using supported beams (e.g., may sweep through multiple SSB resources).

In some examples, the network node 105-a and UE 115-a may use wider beams for the initial access procedure, such as L1 beams and narrower beams for beam refinement procedures. The UE 115-a may receive one or more reference signals on the respective beams, and may select or report one or more beams by identifying a signal metric. For example, the UE 115-a may send a report to the network node 105-a indicating an SSB with a greatest reference signal received power (RSRP) value for a random access channel (RACH) procedure. The described procedure may also be performed by the network node 105-a for selection of a transmission beam of the UE 115-a and for fine tuning of a receive beam at the network node 105-a. In some examples, there may be one or more different types of beam management procedures, such as a first procedure type (P1) for an initial beam selection at a UE 115-a and a network node 105-a, a second procedure type (P2) for a transmission beam refinement at a network node 105-a, and a third procedure type (P3) for a reception beam refinement at the UE 115-a.

In some examples, for a P1 transmission beam selection at the network node 105-a and the UE 115-a, the network node 105-a may sequentially transmit a set of reference signals (RSs) (e.g., a set of one or more synchronization signal blocks (SSBs)) in respective directions as part of a beam sweep (e.g., a downlink reference signal beam sweep). For example, the network node 105-a may, as part of a beam sweep, transmit a first SSB via a beam (e.g., in an initial direction), and may continue to transmit each subsequent SSB of the set of SSBs via beams (e.g., in a direction) adjacent to a direction of the preceding beam until the network node 105-a has successfully transmit each SSB of the set of SSBs. In some cases, the UE 115-a may, as part of a beam selection procedure, identify a beam for communications with the network node 105-a by measuring signaling on one or more beams of a downlink reference signal beam sweep. For example, the UE 115-a may measure a signal strength (e.g., L1-RSRP) of signaling on the one or more beams of the downlink reference signal beam sweep (e.g., from the network node 105-a), and may identify (e.g., select) a downlink beam favorable for communications (e.g., having a strongest L1-RSRP) with the network node 105-a. In some cases, the UE 115-a may perform a beam sweep with one or more reception beams, and may identify a beam of the one or more reception beams that is favorable for receiving signaling.

Additionally, or alternatively, the UE 115-a and the network node 105-a may perform a beam refinement procedure to support beamformed communications (e.g., uplink communications, downlink communications, or both). For example, to refine a downlink reference signal beam in a P2 transmission beam refinement procedure, the network node 105-a may perform a beam sweep over one or more downlink reference signal beams. That is, the network node 105-a may transmit signaling (e.g., a CSI-RSs) using one or more beams at a relatively high granularity (e.g., for narrower beams) within a spatial region of the downlink reference signal beam (e.g., an L1 beam). The UE 115-a may measure (e.g., an L1-RSRP measurement) the one or more narrow downlink reference signal beams via a reception beam for the wide downlink reference signal beam. For example, the UE 115-a may perform the measurements without performing a beam sweep, and may report the L1-RSRP signal strength (e.g., in an L1 report) of one or more strongest beams of the one or more narrow downlink reference signal beams. Additionally, or alternatively, to refine a reception beam for the UE 115-a in a P3 reception beam refinement procedure, the network node 105-a may repeatedly transmit singling (e.g., an SSB) using a same downlink reference signal beam in a burst, where the burst is a quick succession of transmissions. In some cases, the UE 115-a may perform a beam sweep over one or more available reception beams, and may measure each beam of the one or more available reception beams to determine a beam that is desirable (e.g., has a strongest L1-RSRP measurement) for receiving signaling from the network node 105-a on the downlink reference signal beam (e.g., without reporting to the network node 105-a).

In some cases, the UE 115-a and the network node 105-a may experience delays, which may be referred to as beam switching delays, from performing a beam management procedure. For example, the UE 115-*a* may receive a control message (e.g., a DCI message) from the network node 105-*a*, and may decode the control signal (e.g., over a first duration) to determine information indicative of a beam to use for upcoming communications (e.g., a TCI state). That is, the UE 115-*a* may identify a TCI state in the DCI message indicating a configuration for quasi-co location (QCL) relationships between one or more downlink reference signal beams. In some cases, the UE 115-*a* may identify the beam for receiving upcoming communications from the network node 105-*a* (e.g., physical downlink shared channel (PDSCH) messages) by decoding the control message, and may switch to the beam as part of a beam switching procedure (e.g., over a second duration). In some cases, a beam switching delay may include a time taken to decode the control message (e.g., the first duration) and a time taken to perform the beam switching procedure (e.g., the second duration), which may be based on a capability of the UE 115-*a*. For example, a UE 115-*a* may have the capability to decode the control message and perform the beam switching procedure relatively quickly when compared with another UE. The beam switching delay may include a minimum time between the DCI message and a PDSCH message, which may be referred to as a timeDurationForQCL parameter. Additionally, or alternatively, the UE 115-*a* may be operable to buffer samples of a PDSCH prior to decoding the control message based on a default QCL of the UE 115-*a*. For example, the UE 115-*a* may infer properties of the transmission beam (e.g., doppler shift, doppler spread, average delay, delay spread, a spatial reception parameter, or any combination thereof) to buffer the samples based on a QCL relationship with a beam of the UE 115-*a*.

In some examples, the UE 115-*a* may receive a control message initiating a beam refinement procedure (e.g., an uplink beam refinement, a downlink beam refinement, or both). For example, the UE 115-*a* may decode the control message and determine to use a current beam for receiving reference signals (e.g., aperiodic CSI-RSs) via one or more narrow beams as part of a downlink reference signal beam refinement, where there may not be repetition of the reference signals (e.g., repetition=OFF). In such examples, the beam switching delay may include a time taken by the UE 115-*a* to decode the control message. Additionally, or alternatively, the UE 115-*a* may decode the control message and determine to perform a beam sweep over one or more reception beams as part of a receiving beam refinement procedure.

In some cases, such as when the UE 115-*a* is capable of supporting multiple antenna panels, the receiving beam refinement procedure may involve the UE 115-*a* activating one or more antenna panels (e.g., for the one or more reception beams) to receive multiple transmissions of a RS, where there may be repetition of the reference signals (e.g., repetition=ON). In such cases, the beam switching delay may include a time taken by the UE 115-*a* to decode the control message and a time taken to activate the one or more antenna panels at the UE 115-*a*. Thus, the beam switching delay, which may be referred to as a beamSwitchTiming parameter, may include a time the UE 115-*a* uses to switch to a correct beam for receiving an aperiodic reference signal after a triggering DCI message. That is, the UE 115-*a* may support a subcarrier spacing (SCS) having one or more symbol durations for the UE 115-*a* to switch to using a beam for receiving the downlink reference signal. For instance, an SCS of 120 kilohertz (kHz) may incur a first delay (e.g., 14, 28, or 48 symbols), an SCS of 480 kHz may incur a second delay (e.g., 56, 112, or 192 symbols), and an SCS of 960 kHz may incur a third delay (e.g., 112, 224, or 384 symbols). The number of symbols of the delay may be directly related to a capability of the UE 115-*a* to process signaling on the multiple subcarriers. In some cases, such as when the delay includes a time for the UE 115-*a* to activate one or more antenna panels, an SCS may incur greater delays, such as a 224 or 336 symbol delay for a 120 kHz SCS, a 896 or 1344 symbol delay for a 480 kHz SCS, or a 1792 or 2688 symbol delay for a 960 kHz SCS.

Similarly, the network node 105-*a* may experience a beam switching delay, which may be a time between the network node 105-*a* transmitting a downlink reference signal (e.g., an SSB or a CSI-RS) and receiving a beam report from the UE 115-*a* in an uplink transmission. The beam switching delay at the network node 105-*a* may be referred to as a beamReportTiming parameter and may be based on a capability of the UE 115-*a*. That is, the UE 115-*a* may support a SCS having one or more symbol durations for the UE 115-*a* to transmit an L1 beam report to the network node 105-*a*. For instance, an SCS of 120 kHz may incur a first delay (e.g., 14, 28, or 56 symbols), an SCS of 480 kHz may incur a second delay (e.g., 56, 112, or 224 symbols), and an SCS of 960 kHz may incur a third delay (e.g., 112, 224, or 448 symbols).

In some examples, the network node 105-*a* and the UE 115-*a* may perform a beam management procedure via one or more MAC control element (MAC-CE) based communications in accordance with an RRC configuration (e.g., from the network node 105-*a*). For example, the network node 105-*a* may transmit a DCI message to the UE 115-*a* including a grant for receiving a MAC-CE message (e.g., via a PDSCH). In some cases, the UE 115-*a* may receive the MAC-CE message (e.g., for a beam management action) and transmit a feedback message (e.g., a HARQ acknowledgment (HARQ-ACK)) confirming successful reception of the MAC-CE. The UE 115-*a* may then perform the beam management action after a buffer period (e.g., 3 ms after transmission of the HARQ-ACK). In such cases, the beam switching delay may include a time between transmission of the DCI and transmission of the PDSCH (e.g., a scheduling delay, k0), a time between transmission of the PDSCH and transmission the HARQ-ACK (e.g., a feedback delay, k1), and a time between transmission of the HARQ-ACK and performing the beam management action (e.g., the buffer period).

In some examples, the network node 105-*a* and the UE 115-*a* may perform beam switching via RRC signaling, MAC-CE information, or DCI information, and may experience beam switching delays resulting from the delays in each signaling method. For example, the network node 105-*a* may communicate beam switching information by transmitting a DCI message to the UE 115-*a*. In some cases, the network node 105-*a* may configure a CORESET for transmitting the DCI, and may identify a synchronization signal (SS) for the DCI (e.g., a periodic SS). However, indicating beam management information via a DCI message may incur greater delays and power consumption at the UE 115-*a* as the frequency of beam management procedures increases. For example, one or more resources included in the CORSET for the DCI may be in use (e.g., previously scheduled). Additionally, or alternatively, the UE 115-*a* may be unable to monitor for the DCI prior to receiving the synchronization signal (e.g., the next transmission of the periodic SS) and may blind decode a physical downlink control channel (PDCCH) included in the synchronization signal (e.g., consuming extra power). In some cases, such techniques may increase the time, power, or both, the UE 115-*a* uses to perform a beam management procedure.

In some cases, the network node 105-*a* may define a physical layer channel (e.g., a beam management channel 240) dedicated to carrying beam management information (e.g., uplink beam management information, downlink beam management information, or both) to reduce or mitigate time and power spent decoding control messages (e.g., a DCI) including additional information other than the beam management information. The beam management channel 240 may be an example of a light channel with bits dedicated to beam management, which may increase decoding speed at the UE 115-*a*. The network node 105-*a* may configure the physical layer channel to be a coherent channel or a sequence-based non-coherent signal. For example, the network node 105-*a* may dedicate one or more channels to carrying beam management information or may configure a DCI message for beam management information (e.g., carrying bits dedicated to beam management information), which may each be examples of a coherent channel. In some cases, the network node 105-*a* may configure the DCI message for carrying the beam management information to share resources, such as a CORESET, an synchronization signal set, or both, with other DCI messages. In some other cases, the network node 105-*a* may dedicate one or more resources, such as a CORESET, an synchronization signal set, or both, to the DCI message. The dedicated resources may reduce power cost and latency when compared with a DCI message that shares resources, due to increased efficiency while locating and decoding the DCI message.

Additionally, or alternatively, the network node 105-*a* may indicate, to the UE 115-*a*, the beam management information via a sequence based non-coherent signal. For example, the network node 105-*a* may configure a set of sequences to each indicate a respective beam management configuration (e.g., a TCI state, a spatial relation for one or more uplink channels, one or more available TCI states, a reference signal trigger, or any combination thereof). In some cases, the UE 115-*a* may identify a sequence by identifying one or more bits of an reference signal (e.g., bits indicating the cyclic shift) or identifying an index of one or more types of index modulation (e.g., time domain index modulation, frequency domain index modulation, or spatial domain index modulation), or may identify the sequence via a binary modulation scheme (e.g., ON/OFF keying triggered by the presence of one or more reference signals). For example, the UE 115-*a* may determine a quantity of beam management configurations (e.g., four configurations) by identifying a quantity of bits for indicating a cyclic shift (e.g., two bits representing four states). In some other cases, the UE 115-*a* may identify a sequence from a slot index (e.g., time domain index modulation), a subcarrier index (e.g., frequency domain index modulation), or an index of a beam (e.g., spatial domain index modulation), and may determine the beam management configuration from the sequence. Additionally, or alternatively, the UE 115-*a* may toggle one or more flags (e.g., an ON/OFF flag) after identifying the presence of a respective reference signal. That is, the UE 115-*a* may identify a sequence of the flags to determine a beam management configuration (e.g., corresponding to the sequence).

In some examples, the network node 105-*a* may transmit a message (e.g., a control message) to the UE 115-*a* indicating beam parameters for receiving the physical layer channel dedicated to beam management information. For instance, the network node 105-*a* may indicate a QCL state, a TCI state, or both, for the physical layer channel dedicated to beam management information. In some cases, the network node 105-*a* may configure the beam parameters via RRC signaling, MAC-CE information, DCI information, or any combination thereof. Additionally, or alternatively, the UE 115-*a* may determine the beam parameters using an instance of the physical layer channel. For example, the UE 115-*a* may receive a transmission (e.g., a PDSCH), which may be the instance of the physical layer channel, indicating the beam parameters for an upcoming transmission via the physical layer channel dedicated to beam management information.

To support communications via a beam management channel 240 (e.g., a physical layer channel dedicated to beam management information), a network node 105-*a* may transmit, via a physical layer channel 235, a beam management channel configuration 205 (e.g., a control message) identifying a configuration for the beam management channel 240. In some cases, the beam management channel configuration 205 may indicate a periodic or semi-persistently scheduled set of time-frequency resources for the UE 115-*a* to receive the beam management information via the beam management channel 240. Additionally, or alternatively, the beam management channel configuration 205 may include a resource grant (e.g., an aperiodic resource grant, a resource grant identifying set of semi-persistently scheduled resources), which may indicate a quantity of time-frequency resources for the or the UE 115-*a* to receive the beam management information via the beam management channel 240. In some cases, the network node 105-*a* may transmit the resource grant in response to a request for the beam management information from the UE 115-*a*.

In some cases, the network node 105-*a* may transmit a beam management parameters indication 210 to one or more UEs 115 (e.g., the UE 115-*a*, other UEs 115 serviced by the network node 105-*a*) via the beam management channel 240, which may be a physical layer channel dedicated to beam management information. The beam management parameters indication 210 may include one or more beam management parameters for the one or more UEs 115 to use to identify a beam for communications 215 with the network node 105-*a*. For example, the one or more beam management parameters may include a TCI state update for to one or more physical channels (e.g., uplink channels, downlink channels, or both), a spatial relation update for to one or more physical channels (e.g., uplink channels), a flag to activate or deactivate one or more TCI states (e.g., beams), a trigger for an aperiodic reference signal transmission (e.g., a CSI-RS or a sounding reference signal (SRS)), a flag for activating or deactivating a semi-persistent reference signal transmission (e.g., a CSI-RS or a SRS), or any combination thereof. In some cases, the one or more UEs 115 may use the one or more beam management parameters (e.g., included in the beam management parameters indication 210) to perform a beam identification procedure 230. For example, as part of the beam identification procedure 230, the UE 115-*a* may determine to use an identified beam 245 for communications 215 (e.g., uplink communications, downlink communications, or both) and refrain from using one or more inactive beams 250 due to the one or more beam management parameters. In some examples, the network node 105-*a* may configure the UE 115-*a* to provide a feedback message confirming successful receipt (e.g., a HARQ-ACK) of the beam management parameters indication, which may improve the reliability of the beam management channel 240.

In some examples, the network node may indicate a time threshold (e.g., a buffer) indicating an offset to the application of the beam management parameters indication 210 (e.g., the beam identification procedure 230). For example, the UE 115-*a* may receive, in the beam management channel configuration 205, a time threshold indicating when the UE 115-*a* may perform the beam identification procedure 230. In some cases, the network node 105-*a* may receive a capability report from the UE 115-*a*, and may configure the time threshold after receiving the capability report (e.g., configure a relatively smaller time threshold for a UE 115 with relatively quicker processing). In some other cases, the network node 105-*a* may configure different time thresholds for different channels, usages, subcarrier spacings, or any combination thereof. Additionally, or alternatively, the network node 105-*a* may configure the time threshold according to the configuration of the beam management channel 240. For instance, for a non-coherent configuration of the beam management channel 240, the network node 105-*a* may configure the time threshold according to a quantity of hypothesis the UE 115-*a* makes while detecting the beam management channel 240. In some cases, the duration of the time threshold may initiate at reception of the beam management channel configuration 205 (e.g., at the UE 115-*a*) or reception of the feedback message confirming successful reception of beam management channel configuration 205 (e.g., at the network node 105-*a*).

In some cases, network node 105-*a* and the UE 115-*a* may perform communications 215 using the identified beam 245. For example, the UE 115-*a* transmit one or more communications 215 (e.g., uplink communications) via the uplink communications link 225 and using the identified beam 245. Similarly, the UE 115-*a* may receive one or more communications 215 (e.g., downlink communications) via the downlink communications link 220 and using the identified beam 245.

Figure 3:
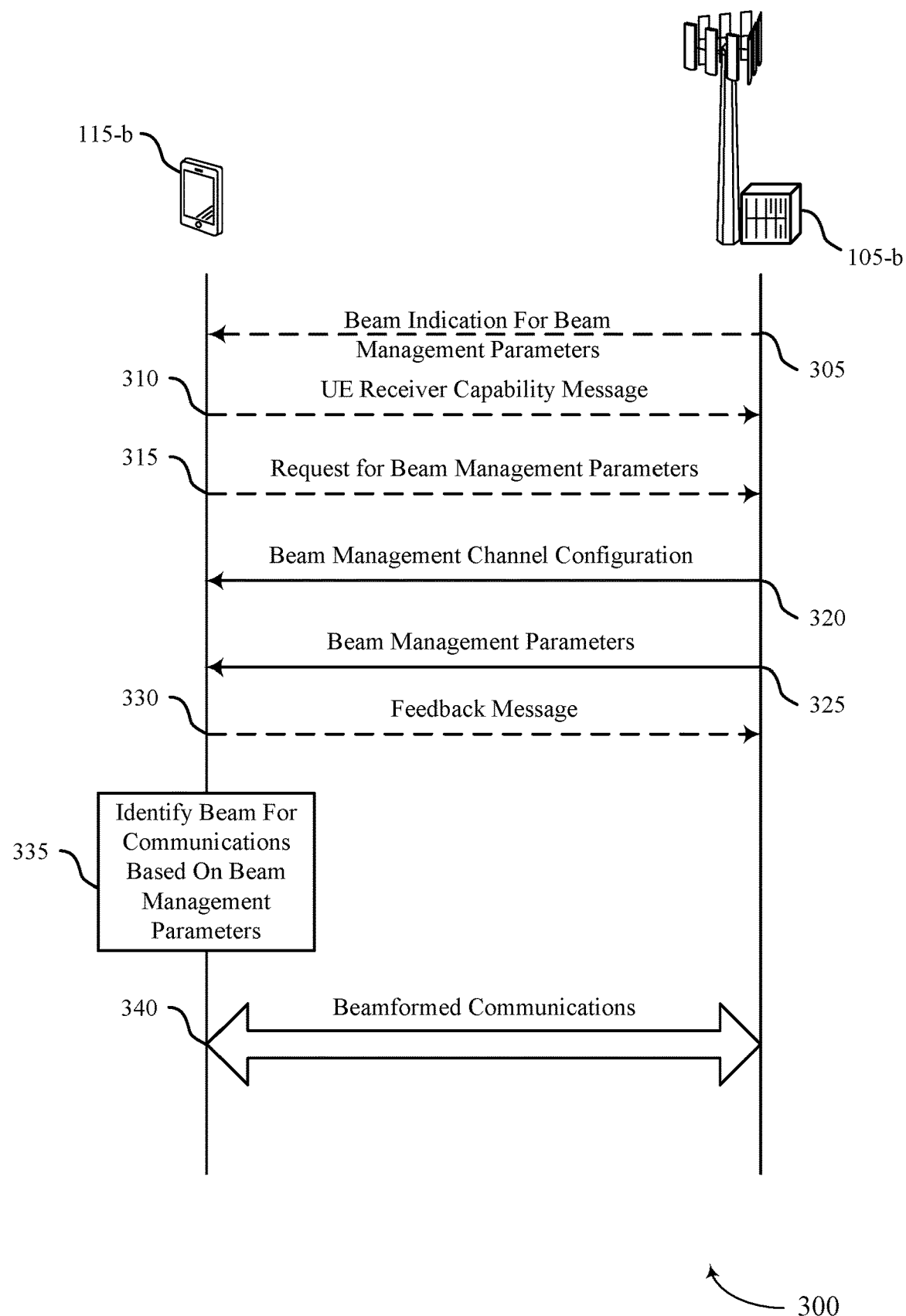
FIG. 3 illustrates an example of a process flow that supports beam management using a dedicated physical layer channel in accordance with one or more aspects of the present disclosure.

FIG. 3 illustrates an example of a process flow 300 that supports beam management using a dedicated physical layer channel in accordance with one or more aspects of the present disclosure. In some examples, the process flow 300 may implement aspects of wireless communications system 100 and wireless communications system 200. The process flow 300 may illustrate an example of a network node 105-*b* configuring a beam management channel at a UE 115-*b*, such that the network node 105-*b* may transmit beam switching information via the beam management channel. The network node 105-*b* and the UE 115-*b* may be examples of a network node 105 and a UE 115 as described with reference to FIGS. 1 and 2. Alternative examples of the following may be implemented, where some processes are performed in a different order than described or are not performed. In some cases, processes may include additional features not mentioned below, or further processes may be added.

At 305, the network node 105-*b* may transmit a message for the one or more UEs 115, including the UE 115-*b*, to use to identify a beam for receiving an indication of one or more beam management parameters. The message may be a control message, such as RRC signaling, a MAC-CE, or a DCI message. Additionally, or alternatively, the UE 115-*b* may identify the beam for receiving the indication of the one or more beam management parameters using an upcoming instance of the channel or signal carrying the one or more beam management parameters.

At 310, the UE 115-*b* may report a receiver capability of the UE 115-*b* to the network node 105-*b*. The receiver capability may include one or more abilities of the receiver to identify and decode different signal types, a decoding efficiency, or the like.

At 315, the UE 115-*b* may request one or more beam management parameters from the network node 105-*b*. The UE 115-*b* may use the beam management parameters to identify one or more beams for communications with the network node 105-*b*.

At 320, the network node 105-*b* may transmit a control message to one or more UEs 115, including the UE 115-*b*, the control message identifying a configuration for a physical layer channel dedicated to beam management information, which may be referred to as a beam management channel. In some examples, the control signaling may be RRC signaling, a MAC-CE, a DCI message, or the like, and the network node 105-*b* may transmit the control message on a different physical layer channel. For example, the network node 105-*b* may transmit an indication of a periodic set of time-frequency resources for the beam management channel, an indication of a semi-persistently schedule set of time-frequency resources for the beam management channel, a grant of downlink time-frequency resources for the UE 115-*b* to use to receive the beam management channel, a grant of downlink time-frequency resources for the UE 115-*b* to use to receive the beam management channel responsive to the request for the one or more beam management parameters, or any combination thereof.

In some cases, the UE 115-*b* may receive an indication of a time threshold for an offset to communications with the network node 105-*b*, where the configuration includes the time threshold. The offset may be between the beam management channel or signaling on the beam management channel and the application of the information received in the beam management channel (e.g., the communications with the network node 105-*b*). The UE 115-*b* may receive the time threshold at least in part in response to the transmitted receiver capability.

At 325, the UE 115-*b* may receive the beam management parameters via the beam management channel and according to the configuration. In some cases, the UE 115-*b* may receive the beam management parameters in response to a grant identifying resources of the semi-persistently scheduled set of time-frequency resources. In some examples, the UE 115-*b* may receive a DCI message identifying the beam management parameters. The DCI message may have a first format type for beam management, and may share a CORE-SET or synchronization signal set with a different DCI format type. In some other examples, the UE 115-*b* may receive the DCI message via a CORESET or a synchronization signal set dedicated to communicating the first DCI format type for beam management.

In some cases, the UE 115-*b* may receive a sequence-based non-coherent signal that indicates the beam management parameters, where a non-coherent signal has different frequency, different phase, or both than another signal sent via a same channel and a sequence-based signal has a transmission sequence in the frequency-domain. The sequence-based non-coherent signal may include different reference signal properties, be received according to ON/OFF keying, may have a type of index modulation, or any combination thereof that indicates the beam management parameters. In some examples, the one or more beam management parameters may include a TCI state update for one or more uplink channels, a TCI state update for one or more downlink channels, a spatial relation update for one or more uplink channels, a first flag activating or deactivating one or more TCI states, a trigger for an aperiodic reference signal transmission (e.g., CSI-RS and/or SRS), a second flag activating or deactivating a semi-persistent reference signal transmission (e.g., CSI-RS and/or SRS), or any combination thereof.

At 330, the UE 115-*b* may transmit a feedback message (e.g., a HARQ-ACK) identifying that the UE 115-*b* has successfully received the indication of the one or more beam management parameters. In some cases, the time offset may be based on the difference between a received HARQ-ACK and the application of the indication of the beam management parameters (e.g., to identify a beam for communications).

At 335, the UE 115-*b* may identify one or more beams for communications with the network node 105-*b* using the beam management parameters. For example, the UE 115-*b* may identify an uplink beam, a downlink beam, or both based on the parameters indicating the uplink beam, the downlink beam, or both.

At 340, the UE 115-*b* may communicate with the network node 105-*b* using the identified one or more beams. For example, the UE 115-*b* may transmit one or more uplink messages to the network node 105-*b* using an uplink beam, may receive one or more downlink messages from the network node 105-*b* using a downlink beam, or both.

Figure 4:
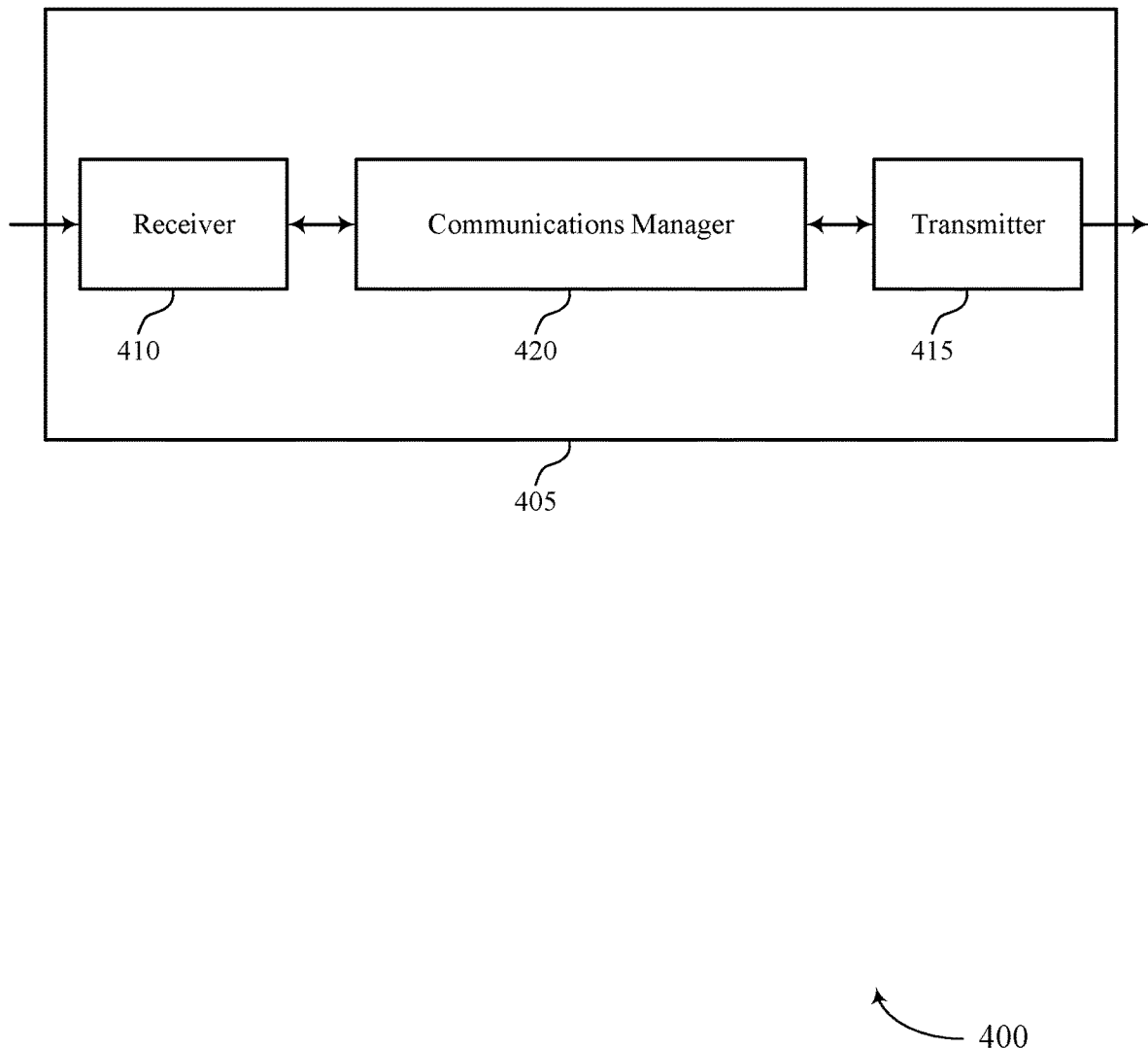
FIGS. 4 and 5 show block diagrams of devices that support beam management using a dedicated physical layer channel in accordance with one or more aspects of the present disclosure.

FIG. 4 shows a block diagram 400 of a device 405 that supports beam management using a dedicated physical layer channel in accordance with one or more aspects of the present disclosure. The device 405 may be an example of aspects of a UE 115 as described herein. The device 405 may include a receiver 410, a transmitter 415, and a communications manager 420. The device 405 may also include a one or more processors, memory coupled with the one or more processors, and instructions stored in the memory that are executable by the one or more processors to enable the one or more processors to perform the beam management features discussed herein. Each of these components may be in communication with one another (e.g., via one or more buses).

The receiver 410 may provide a means for receiving information such as packets, user data, control information, or any combination thereof associated with various information channels (e.g., control channels, data channels, information channels related to beam management using a dedicated physical layer channel). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to beam management using a dedicated physical layer channel). In some examples, the transmitter 415 may be co-located with a receiver 410 in a transceiver module. The transmitter 415 may utilize a single antenna or a set of multiple antennas.

The communications manager 420, the receiver 410, the transmitter 415, or various combinations thereof or various components thereof may be examples of means for performing various aspects of beam management using a dedicated physical layer channel as described herein. For example, the communications manager 420, the receiver 410, the transmitter 415, or various combinations or components thereof may support a method for performing one or more of the functions described herein.

In some examples, the communications manager 420, the receiver 410, the transmitter 415, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 420, the receiver 410, the transmitter 415, or various combinations or components thereof may be implemented in code (e.g., as communications management software or firmware) executed by a processor. If implemented in code executed by a processor, the functions of the communications manager 420, the receiver 410, the transmitter 415, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 420 may be configured to perform various operations (e.g., receiving, obtaining, monitoring, outputting, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to obtain information, output information, or perform various other operations as described herein.

The communications manager 420 may support wireless communication at a UE in accordance with examples as disclosed herein. For example, the communications manager 420 may be configured as or otherwise support a means for receiving, via a first physical layer channel, a control message identifying a configuration for a second physical layer channel dedicated to beam management information. The communications manager 420 may be configured as or otherwise support a means for receiving, via the second physical layer channel dedicated to the beam management information according to the configuration, an indication of one or more beam management parameters for the UE to use to identify a first beam for communications with a network node. The communications manager 420 may be configured as or otherwise support a means for communicating with the network node using the first beam identified by the UE in accordance with the one or more beam management parameters received via the second physical layer channel dedicated to the beam management information.

By including or configuring the communications manager 420 in accordance with examples as described herein, the device 405 (e.g., a processor controlling or otherwise coupled with the receiver 410, the transmitter 415, the communications manager 420, or a combination thereof) may support techniques for reduced power consumption and latency by defining a physical layer channel dedicated to beam management information.

Figure 5:
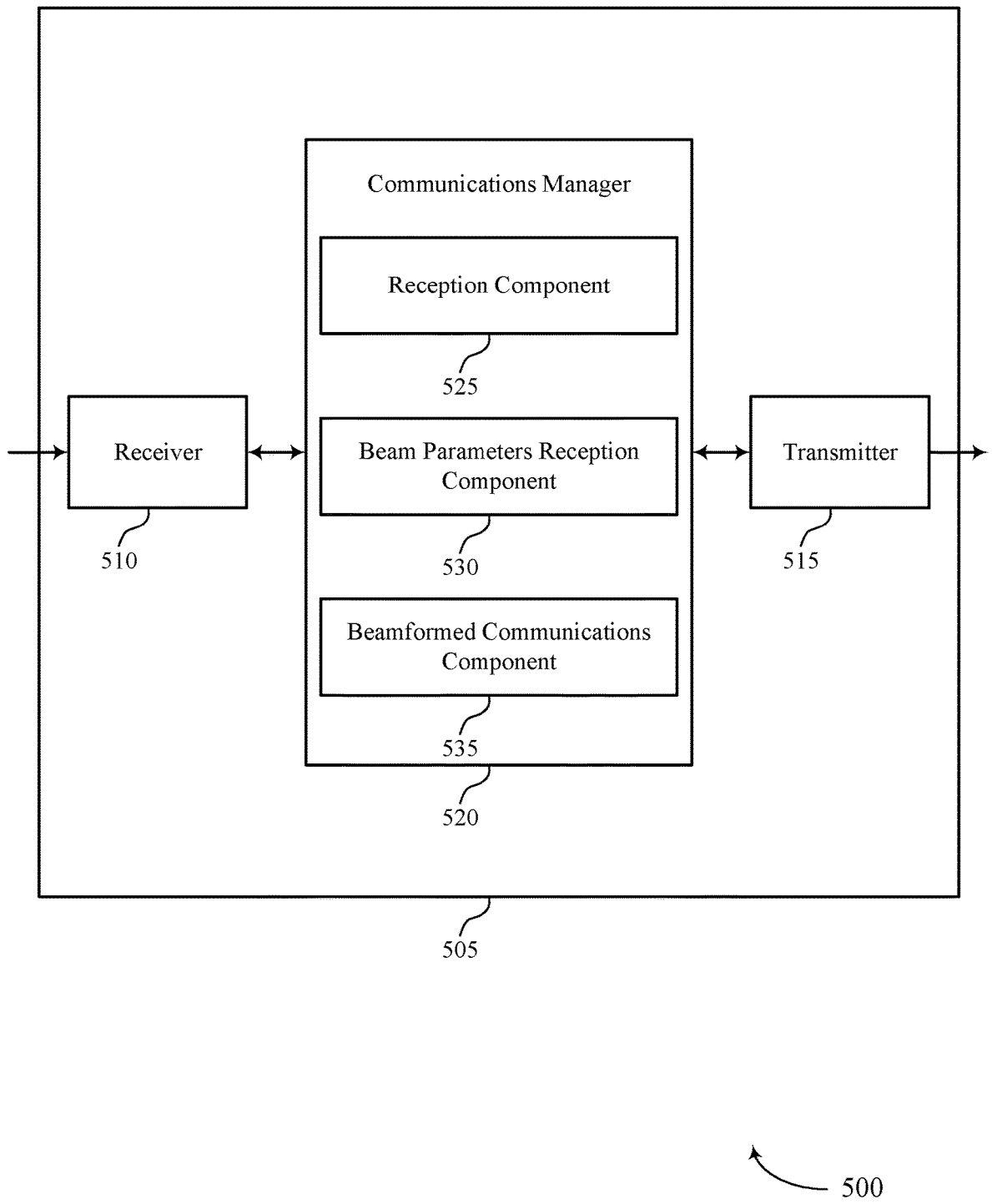

FIG. 5 shows a block diagram 500 of a device 505 that supports beam management using a dedicated physical layer channel in accordance with one or more aspects of the present disclosure. The device 505 may be an example of aspects of a device 405 or a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to beam management using a dedicated physical layer channel). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to beam management using a dedicated physical layer channel). In some examples, the transmitter 515 may be co-located with a receiver 510 in a transceiver module. The transmitter 515 may utilize a single antenna or a set of multiple antennas.

The device 505, or various components thereof, may be an example of means for performing various aspects of beam management using a dedicated physical layer channel as described herein. For example, the communications manager 520 may include a reception component 525, a beam parameters reception component 530, a beamformed communications component 535, or any combination thereof. The communications manager 520 may be an example of aspects of a communications manager 420 as described herein. In some examples, the communications manager 520, or various components thereof, may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communication at a UE in accordance with examples as disclosed herein. The reception component 525 may be configured as or otherwise support a means for receiving, via a first physical layer channel, a control message identifying a configuration for a second physical layer channel dedicated to beam management information. The beam parameters reception component 530 may be configured as or otherwise support a means for receiving, via the second physical layer channel dedicated to the beam management information according to the configuration, an indication of one or more beam management parameters for the UE to use to identify a first beam for communications with a network node. The beamformed communications component 535 may be configured as or otherwise support a means for communicating with the network node using the first beam identified by the UE in accordance with the one or more beam management parameters received via the second physical layer channel dedicated to the beam management information.

In some cases, the reception component 525, the beam parameters reception component 530, the beamformed communications component 535 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the reception component 525, the beam parameters reception component 530, the beamformed communications component 535 discussed herein. A transceiver processor may be collocated with and/or communicate with (e.g., direct the operations of) a transceiver of the device. A radio processor may be collocated with and/or communicate with (e.g., direct the operations of) a radio (e.g., an NR radio, an LTE radio, a Wi-Fi radio) of the device. A transmitter processor may be collocated with and/or communicate with (e.g., direct the operations of) a transmitter of the device. A receiver processor may be collocated with and/or communicate with (e.g., direct the operations of) a receiver of the device.

Figure 6:
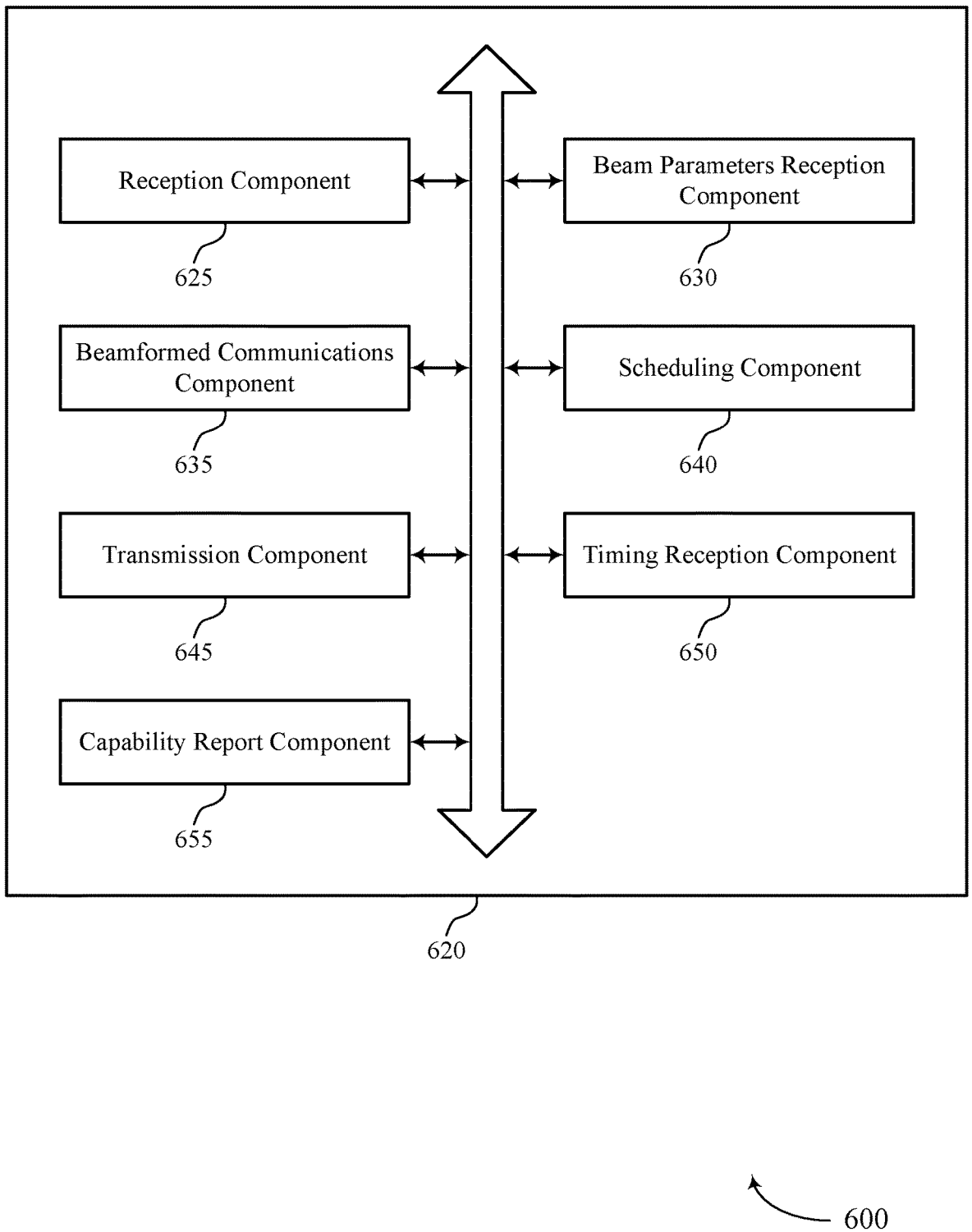
FIG. 6 shows a block diagram of a communications manager that supports beam management using a dedicated physical layer channel in accordance with one or more aspects of the present disclosure.

FIG. 6 shows a block diagram 600 of a communications manager 620 that supports beam management using a dedicated physical layer channel in accordance with one or more aspects of the present disclosure. The communications manager 620 may be an example of aspects of a communications manager 420, a communications manager 520, or both, as described herein. The communications manager 620, or various components thereof, may be an example of means for performing various aspects of beam management using a dedicated physical layer channel as described herein. For example, the communications manager 620 may include a reception component 625, a beam parameters reception component 630, a beamformed communications component 635, a scheduling component 640, a transmission component 645, a timing reception component 650, a capability report component 655, or any combination thereof. Each of these components may communicate, directly or indirectly, with one another (e.g., via one or more buses).

The communications manager 620 may support wireless communication at a UE in accordance with examples as disclosed herein. The reception component 625 may be configured as or otherwise support a means for receiving, via a first physical layer channel, a control message identifying a configuration for a second physical layer channel dedicated to beam management information. The beam parameters reception component 630 may be configured as or otherwise support a means for receiving, via the second physical layer channel dedicated to the beam management information according to the configuration, an indication of one or more beam management parameters for the UE to use to identify a first beam for communications with a network node. The beamformed communications component 635 may be configured as or otherwise support a means for communicating with the network node using the first beam identified by the UE in accordance with the one or more beam management parameters received via the second physical layer channel dedicated to the beam management information.

In some examples, to support receiving the indication of the one or more beam management parameters, the reception component 625 may be configured as or otherwise support a means for receiving a downlink control information message identifying the one or more beam management parameters.

In some examples, the downlink control information message is of a first downlink control information format type for beam management and shares a control resource set or a synchronization signal set with at least a second downlink control information format type different from the first downlink control information format type.

In some examples, the downlink control information message is received via a control resource set or a synchronization signal set dedicated to communicating a first downlink control information format type for beam management.

In some examples, to support receiving the indication of the one or more beam management parameters, the reception component 625 may be configured as or otherwise support a means for receiving a sequence-based non-coherent signal that corresponds to the one or more beam management parameters.

In some examples, the sequence-based non-coherent signal is associated with different reference signal properties, is received according to ON/OFF keying, corresponds to a type of index modulation, or any combination thereof.

In some examples, to support configuration for the second physical layer channel dedicated to the beam management information, the scheduling component 640 may be configured as or otherwise support a means for an indication of a periodic set of time-frequency resources for the second physical layer channel. In some examples, to support configuration for the second physical layer channel dedicated to the beam management information, the scheduling component 640 may be configured as or otherwise support a means for an indication of a semi-persistently scheduled set of time-frequency resources for the second physical layer channel, where the UE receives the indication of the one or more beam management parameters via the second physical layer channel in response to a grant identifying resources of the semi-persistently scheduled set of time-frequency resources. In some examples, to support configuration for the second physical layer channel dedicated to the beam management information, the scheduling component 640 may be configured as or otherwise support a means for a grant of downlink time-frequency resources for the UE to use to receive the second physical layer channel. In some examples, to support configuration for the second physical layer channel dedicated to the beam management information, the scheduling component 640 may be configured as or otherwise support a means for a grant of downlink time-frequency resources for the UE to use to receive the second physical layer channel responsive to a request for the one or more beam management parameters transmitted to the network node by the UE. In some examples, to support configuration for the second physical layer channel dedicated to the beam management information, the scheduling component 640 may be configured as or otherwise support a means for any combination thereof.

In some examples, the transmission component 645 may be configured as or otherwise support a means for transmitting a feedback message identifying that the UE has successfully received the indication of the one or more beam management parameters.

In some examples, to support receiving the control message identifying the configuration, the timing reception component 650 may be configured as or otherwise support a means for receiving an indication of a time threshold associated with an offset to the communications with the network node, where the configuration includes the time threshold.

In some examples, the capability report component 655 may be configured as or otherwise support a means for transmitting a receiver capability of the UE, where the time threshold is received at least in part in response to the transmitted receiver capability.

In some examples, the reception component 625 may be configured as or otherwise support a means for receiving, prior to receiving the control message, a message indicating a second beam for receiving the indication of the one or more beam management parameters.

In some examples, the one or more beam management parameters include a TCI state corresponding to one or more third physical layer channels, a spatial relation corresponding to the one or more third physical layer channels, a first flag activating or deactivating the TCI state, a trigger for an aperiodic reference signal transmission, a second flag activating or deactivating a semi-persistent reference signal transmission, or any combination thereof.

In some examples, to support communicating with the network node, the transmission component 645 may be configured as or otherwise support a means for transmitting, using the first beam, one or more uplink messages to the network node. In some examples, to support communicating with the network node, the reception component 625 may be configured as or otherwise support a means for receiving, using the first beam, one or more downlink messages from the network node. In some examples, to support communicating with the network node, the beamformed communications component 635 may be configured as or otherwise support a means for any combination thereof.

In some cases, the reception component 625, the beam parameters reception component 630, the beamformed communications component 635, the scheduling component 640, the transmission component 645, the timing reception component 650, and the capability report component 655 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the reception component 625, the beam parameters reception component 630, the beamformed communications component 635, the scheduling component 640, the transmission component 645, the timing reception component 650, and the capability report component 655 discussed herein.

Figure 7:
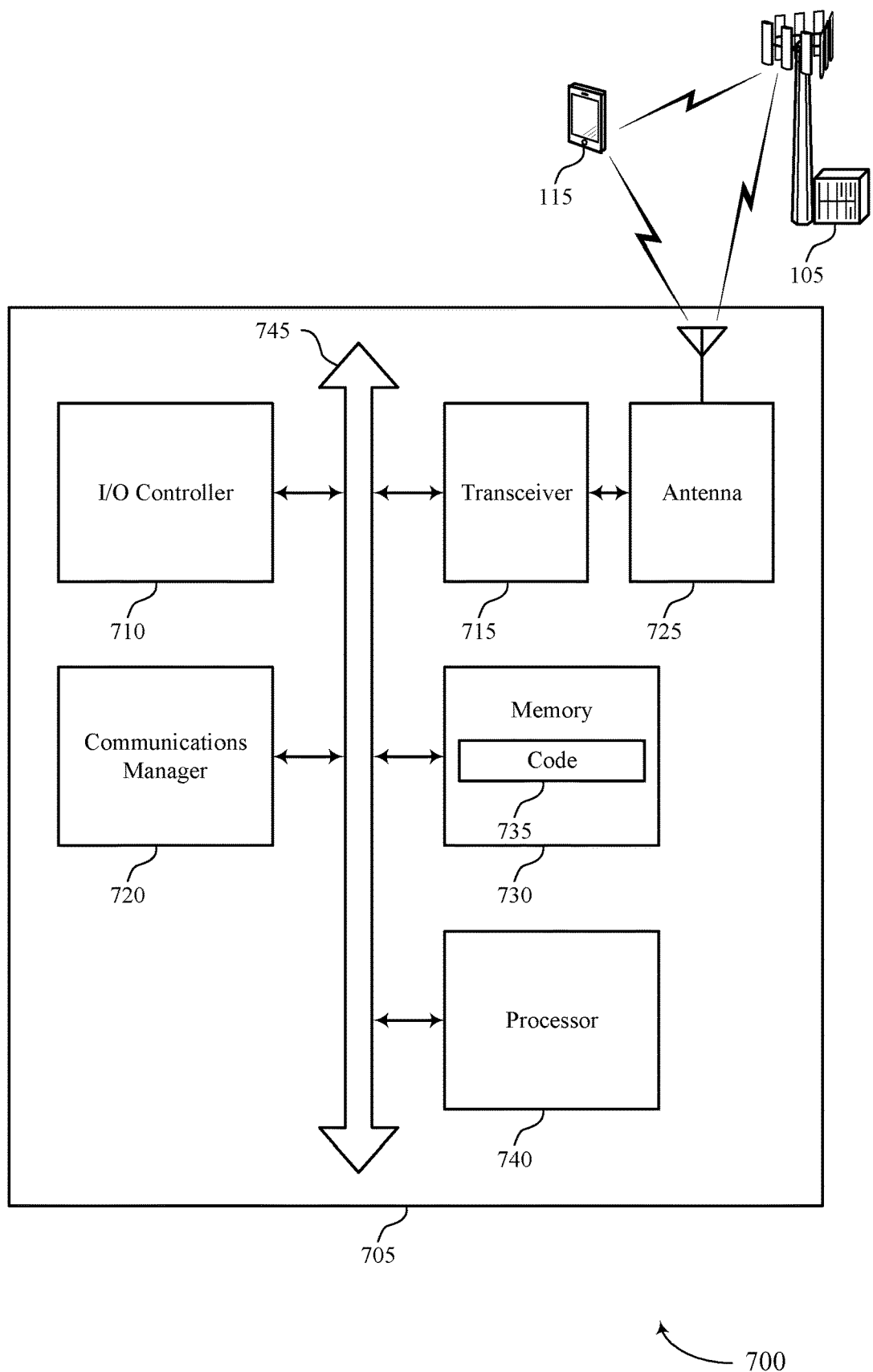
FIG. 7 shows a diagram of a system including a device that supports beam management using a dedicated physical layer channel in accordance with one or more aspects of the present disclosure.

FIG. 7 shows a diagram of a system 700 including a device 705 that supports beam management using a dedicated physical layer channel in accordance with one or more aspects of the present disclosure. The device 705 may be an example of or include the components of a device 405, a device 505, or a UE 115 as described herein. The device 705 may communicate (e.g., wirelessly) with one or more network nodes 105, one or more UEs 115, or any combination thereof. The device 705 may include components for bi-directional voice and data communications including components for transmitting and receiving communications, such as a communications manager 720, an input/output (I/O) controller 710, a transceiver 715, an antenna 725, a memory 730, code 735, and a processor 740. These components may be in electronic communication or otherwise coupled (e.g., operatively, communicatively, functionally, electronically, electrically) via one or more buses (e.g., a bus 745).

The I/O controller 710 may manage input and output signals for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. Additionally, or alternatively, the I/O controller 710 may represent or interact with a modem, a keyboard, a mouse, a touchscreen, or a similar device. In some cases, the I/O controller 710 may be implemented as part of a processor, such as the processor 740. In some cases, a user may interact with the device 705 via the I/O controller 710 or via hardware components controlled by the I/O controller 710.

In some cases, the device 705 may include a single antenna 725. However, in some other cases, the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The memory 730 may include random access memory (RAM) and read-only memory (ROM). The memory 730 may store computer-readable, computer-executable code 735 including instructions that, when executed by the processor 740, cause the device 705 to perform various functions described herein. The code 735 may be stored in a non-transitory computer-readable medium such as system memory or another type of memory. In some cases, the code 735 may not be directly executable by the processor 740 but may cause a computer (e.g., when compiled and executed) to perform functions described herein. In some cases, the memory 730 may contain, among other things, a basic I/O system (BIOS) which may control basic hardware or software operation such as the interaction with peripheral components or devices.

The processor 740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In some other cases, a memory controller may be integrated into the processor 740. The processor 740 may be configured to execute computer-readable instructions stored in a memory (e.g., the memory 730) to cause the device 705 to perform various functions (e.g., functions or tasks supporting beam management using a dedicated physical layer channel). For example, the device 705 or a component of the device 705 may include a processor 740 and memory 730 coupled with or to the processor 740, the processor 740 and memory 730 configured to perform various functions described herein.

The communications manager 720 may support wireless communication at a UE in accordance with examples as disclosed herein. For example, the communications manager 720 may be configured as or otherwise support a means for receiving, via a first physical layer channel, a control message identifying a configuration for a second physical layer channel dedicated to beam management information. The communications manager 720 may be configured as or otherwise support a means for receiving, via the second physical layer channel dedicated to the beam management information according to the configuration, an indication of one or more beam management parameters for the UE to use to identify a first beam for communications with a network node. The communications manager 720 may be configured as or otherwise support a means for communicating with the network node using the first beam identified by the UE in accordance with the one or more beam management parameters received via the second physical layer channel dedicated to the beam management information.

By including or configuring the communications manager 720 in accordance with examples as described herein, the device 705 may support techniques for reduced latency, improved user experience related to reduced processing, and reduced power consumption.

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the processor 740, the memory 730, the code 735, or any combination thereof. For example, the code 735 may include instructions executable by the processor 740 to cause the device 705 to perform various aspects of beam management using a dedicated physical layer channel as described herein, or the processor 740 and the memory 730 may be otherwise configured to perform or support such operations.

Figure 8:
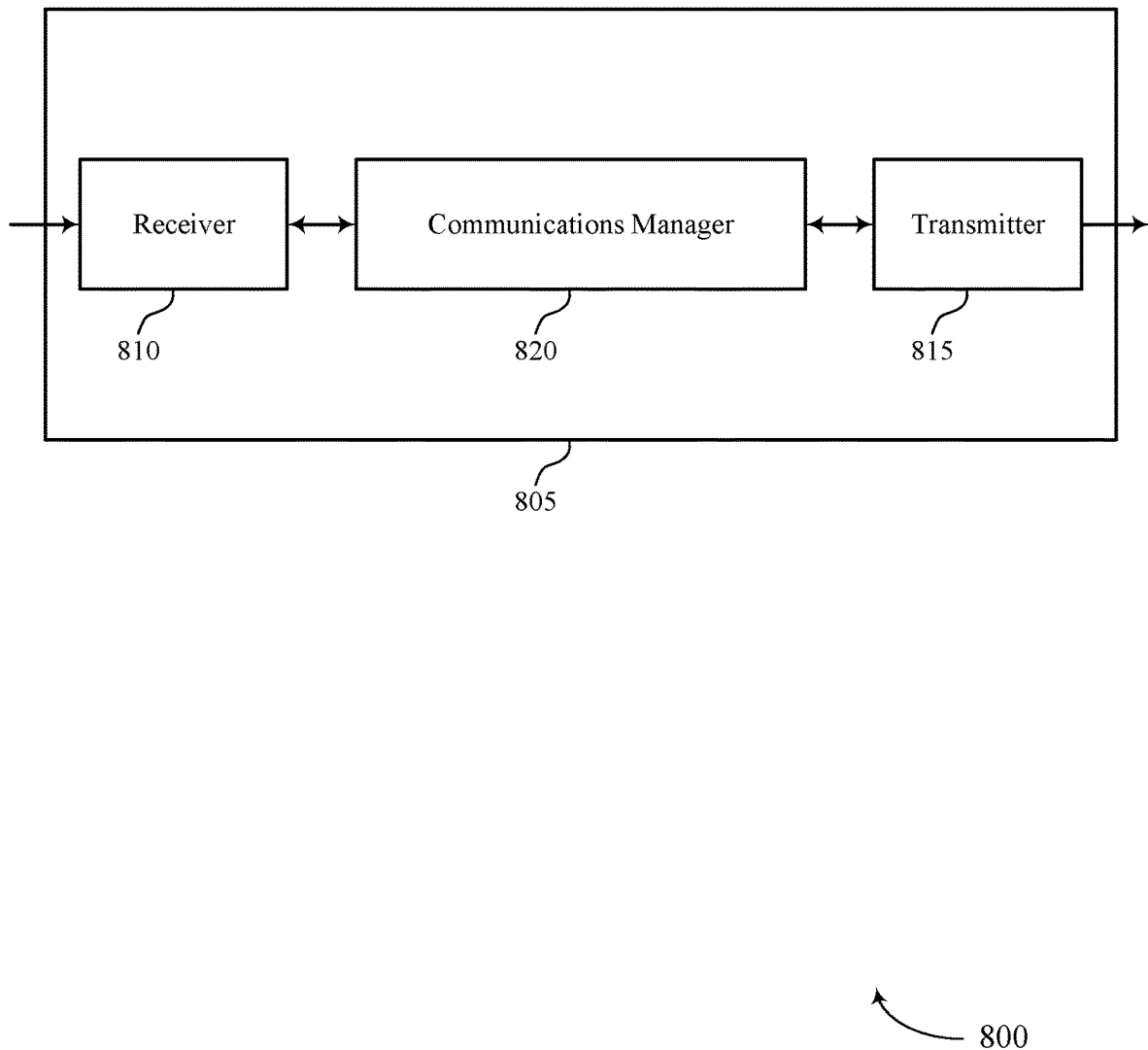
FIGS. 8 and 9 show block diagrams of devices that support beam management using a dedicated physical layer channel in accordance with one or more aspects of the present disclosure.

FIG. 8 shows a block diagram 800 of a device 805 that supports beam management using a dedicated physical layer channel in accordance with one or more aspects of the present disclosure. The device 805 may be an example of aspects of a network node 105 as described herein. The device 805 may include a receiver 810, a transmitter 815, and a communications manager 820. The device 805 may also include a processor. Each of these components may be in communication with one another (e.g., via one or more buses).

The receiver 810 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 805. In some examples, the receiver 810 may support obtaining information by receiving signals via one or more antennas. Additionally, or alternatively, the receiver 810 may support obtaining information by receiving signals via one or more wired (e.g., electrical, fiber optic) interfaces, wireless interfaces, or any combination thereof.

The transmitter 815 may provide a means for outputting (e.g., transmitting, providing, conveying, sending) information generated by other components of the device 805. For example, the transmitter 815 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 815 may support outputting information by transmitting signals via one or more antennas. Additionally, or alternatively, the transmitter 815 may support outputting information by transmitting signals via one or more wired (e.g., electrical, fiber optic) interfaces, wireless interfaces, or any combination thereof. In some examples, the transmitter 815 and the receiver 810 may be co-located in a transceiver, which may include or be coupled with a modem.

The communications manager 820, the receiver 810, the transmitter 815, or various combinations thereof or various components thereof may be examples of means for performing various aspects of beam management using a dedicated physical layer channel as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 820 may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communication at a network node in accordance with examples as disclosed herein. For example, the communications manager 820 may be configured as or otherwise support a means for transmitting, via a first physical layer channel, a control message identifying a configuration for a second physical layer channel dedicated to beam management information. The communications manager 820 may be configured as or otherwise support a means for transmitting, via the second physical layer channel dedicated to the beam management information according to the configuration, an indication of one or more beam management parameters for one or more UEs to use to identify a first beam for communications with the network node. The communications manager 820 may be configured as or otherwise support a means for communicating with the one or more UEs based on transmitting the indication of the one or more beam management parameters transmitted via the second physical layer channel dedicated to the beam management information.

By including or configuring the communications manager 820 in accordance with examples as described herein, the device 805 (e.g., a processor controlling or otherwise coupled with the receiver 810, the transmitter 815, the communications manager 820, or a combination thereof) may support techniques for reduced power consumption and latency by defining a physical layer channel dedicated to beam management information.

Figure 9:
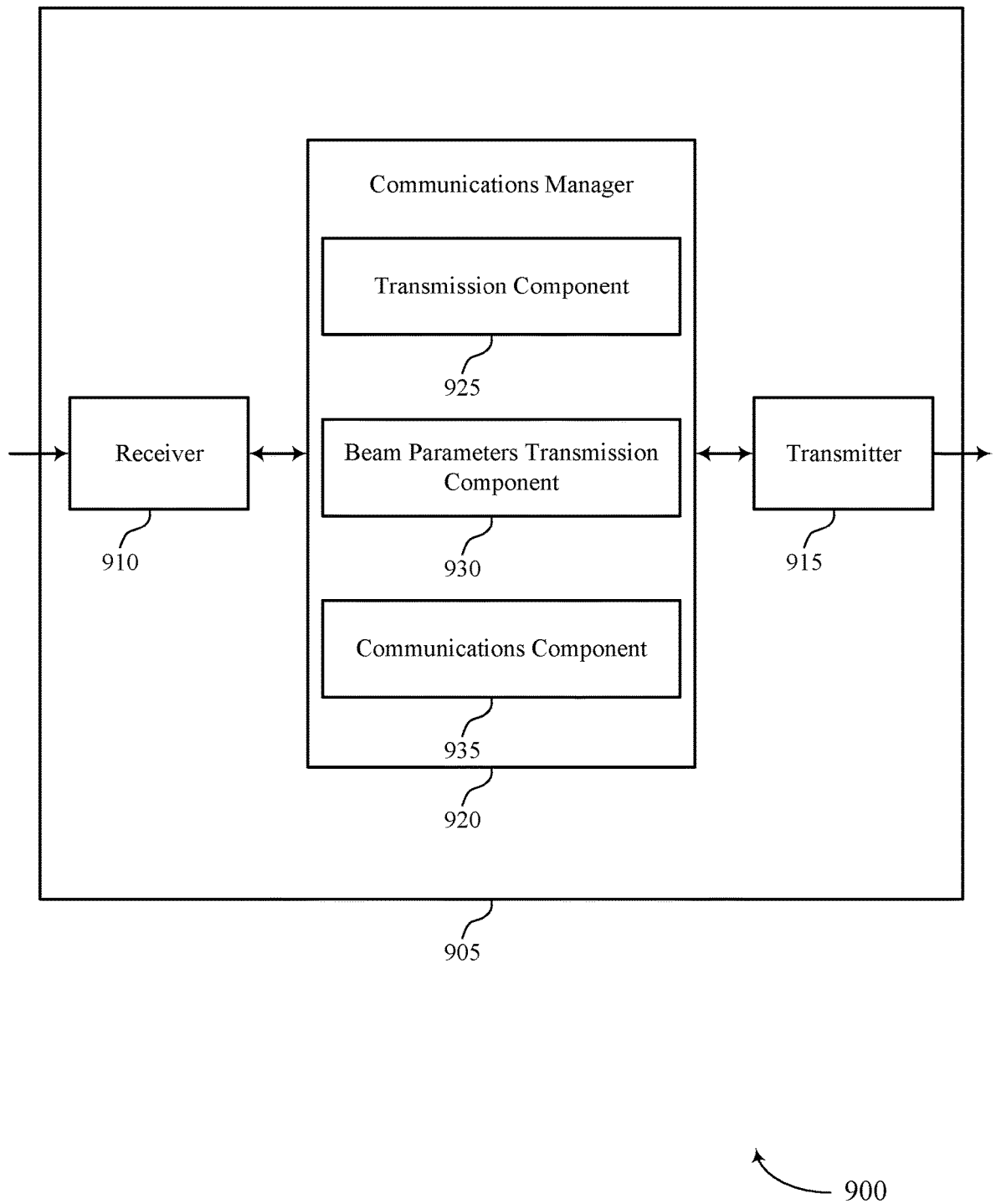

FIG. 9 shows a block diagram 900 of a device 905 that supports beam management using a dedicated physical layer channel in accordance with one or more aspects of the present disclosure. The device 905 may be an example of aspects of a device 805 or a network node 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The device 905, or various components thereof, may be an example of means for performing various aspects of beam management using a dedicated physical layer channel as described herein. For example, the communications manager 920 may include a transmission component 925, a beam parameters transmission component 930, a communications component 935, or any combination thereof. The communications manager 920 may be an example of aspects of a communications manager 820 as described herein. In some examples, the communications manager 920, or various components thereof, may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communication at a network node in accordance with examples as disclosed herein. The transmission component 925 may be configured as or otherwise support a means for transmitting, via a first physical layer channel, a control message identifying a configuration for a second physical layer channel dedicated to beam management information. The beam parameters transmission component 930 may be configured as or otherwise support a means for transmitting, via the second physical layer channel dedicated to the beam management information according to the configuration, an indication of one or more beam management parameters for one or more UEs to use to identify a first beam for communications with the network node. The communications component 935 may be configured as or otherwise support a means for communicating with the one or more UEs based on transmitting the indication of the one or more beam management parameters transmitted via the second physical layer channel dedicated to the beam management information.

Figure 10:
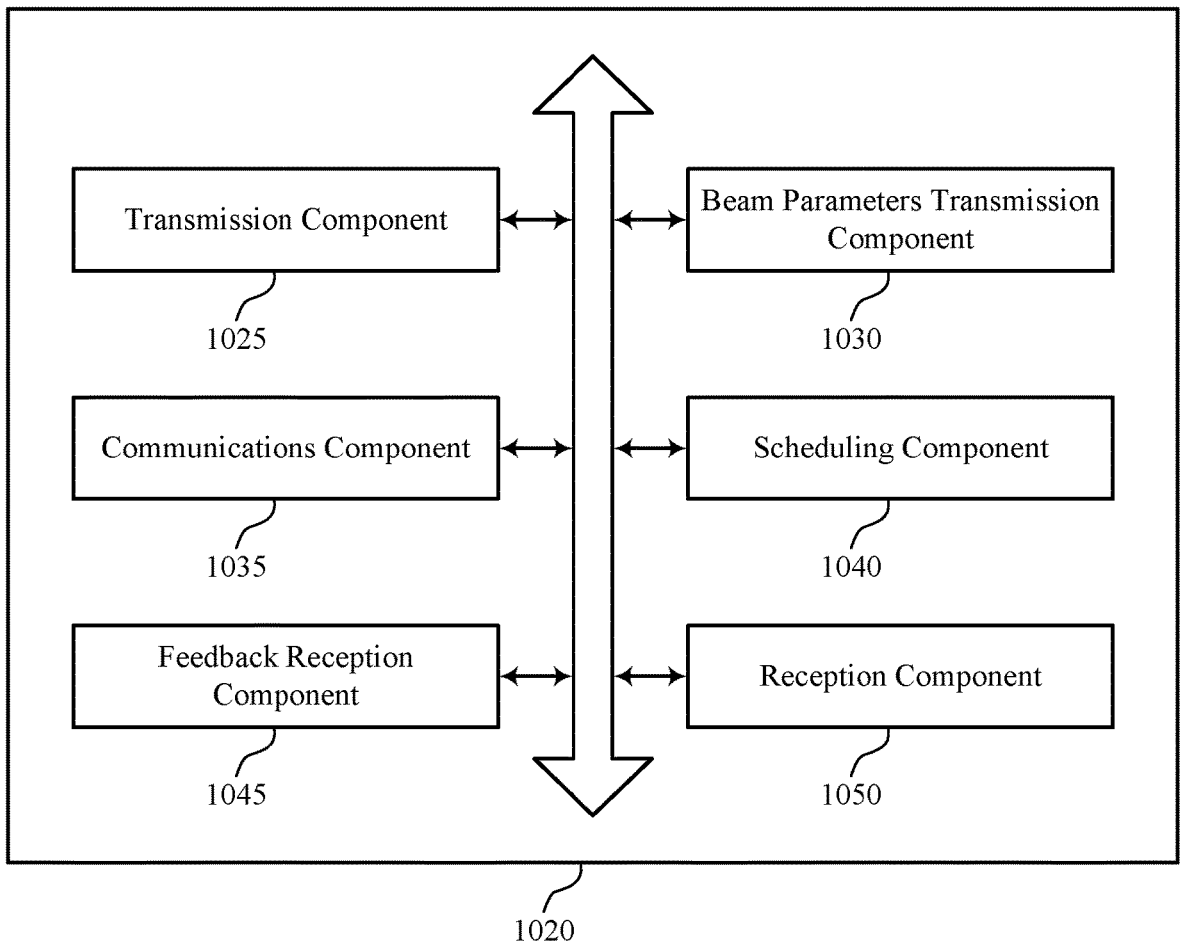
FIG. 10 shows a block diagram of a communications manager that supports beam management using a dedicated physical layer channel in accordance with one or more aspects of the present disclosure.

FIG. 10 shows a block diagram 1000 of a communications manager 1020 that supports beam management using a dedicated physical layer channel in accordance with one or more aspects of the present disclosure. The communications manager 1020 may be an example of aspects of a communications manager 820, a communications manager 920, or both, as described herein. The communications manager 1020, or various components thereof, may be an example of means for performing various aspects of beam management using a dedicated physical layer channel as described herein. For example, the communications manager 1020 may include a transmission component 1025, a beam parameters transmission component 1030, a communications component 1035, a scheduling component 1040, a feedback reception component 1045, a reception component 1050, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network node 105, between devices, components, or virtualized components associated with a network node 105), or any combination thereof.

The communications manager 1020 may support wireless communication at a network node in accordance with examples as disclosed herein. The transmission component 1025 may be configured as or otherwise support a means for transmitting, via a first physical layer channel, a control message identifying a configuration for a second physical layer channel dedicated to beam management information. The beam parameters transmission component 1030 may be configured as or otherwise support a means for transmitting, via the second physical layer channel dedicated to the beam management information according to the configuration, an indication of one or more beam management parameters for one or more UEs to use to identify a first beam for communications with the network node. The communications component 1035 may be configured as or otherwise support a means for communicating with the one or more UEs based on transmitting the indication of the one or more beam management parameters transmitted via the second physical layer channel dedicated to the beam management information.

In some examples, to support transmitting the control message identifying the configuration, the transmission component 1025 may be configured as or otherwise support a means for transmitting an indication of a time threshold associated with an offset to the communications with the one or more UEs, where the configuration includes the time threshold.

In some examples, the time threshold is based on a capability of a receiver of the one or more UEs, a third physical layer channel corresponding to the communications, a subcarrier spacing of the indication, a type of signaling carrying the indication, or any combination thereof.

In some examples, to support transmitting the indication of the one or more beam management parameters, the transmission component 1025 may be configured as or otherwise support a means for transmitting a downlink control information message identifying the one or more beam management parameters.

In some examples, the downlink control information message is of a first downlink control information format type for beam management and shares a control resource set or a synchronization signal set with at least a second downlink control information format type different from the first downlink control information format type.

In some examples, the downlink control information message is transmitted via a control resource set or a synchronization signal set dedicated to communicating a first downlink control information format type for beam management.

In some examples, to support transmitting the indication of the one or more beam management parameters, the transmission component 1025 may be configured as or otherwise support a means for transmitting a sequence-based non-coherent signal that corresponds to the one or more beam management parameters.

In some examples, the sequence-based non-coherent signal is associated with different reference signal properties, is transmitted according to ON/OFF keying, corresponds to a type of index modulation, or any combination thereof.

In some examples, to support configuration for the second physical layer channel dedicated to the beam management information, the scheduling component 1040 may be configured as or otherwise support a means for an indication of a periodic set of time-frequency resources for the second physical layer channel. In some examples, to support configuration for the second physical layer channel dedicated to the beam management information, the scheduling component 1040 may be configured as or otherwise support a means for an indication of a semi-persistently scheduled set of time-frequency resources for the second physical layer channel, where the network node transmits the indication of the one or more beam management parameters via the second physical layer channel based on transmitting a grant identifying resources of the semi-persistently scheduled set of time-frequency resources. In some examples, to support configuration for the second physical layer channel dedicated to the beam management information, the scheduling component 1040 may be configured as or otherwise support a means for a grant of downlink time-frequency resources for the one or more UEs to use to receive the second physical layer channel. In some examples, to support configuration for the second physical layer channel dedicated to the beam management information, the scheduling component 1040 may be configured as or otherwise support a means for a grant of downlink time-frequency resources for the one or more UEs to use to receive the second physical layer channel responsive to a request for the one or more beam management parameters received at the network node from the one or more UEs. In some examples, to support configuration for the second physical layer channel dedicated to the beam management information, the scheduling component 1040 may be configured as or otherwise support a means for any combination thereof.

In some examples, the feedback reception component 1045 may be configured as or otherwise support a means for receiving a feedback message identifying that the one or more UEs have successfully received the indication of the one or more beam management parameters.

In some examples, the transmission component 1025 may be configured as or otherwise support a means for transmitting, prior to transmitting the control message, a message for the one or more UEs to use to identify a second beam for receiving the indication of the one or more beam management parameters.

In some examples, the one or more beam management parameters include a TCI state corresponding to one or more third physical layer channels, a spatial relation corresponding to the one or more third physical layer channels, a first flag activating or deactivating the TCI state, a trigger for an aperiodic reference signal transmission, a second flag activating or deactivating a semi-persistent reference signal transmission, or any combination thereof.

In some examples, to support communicating with the one or more UEs, the reception component 1050 may be configured as or otherwise support a means for receiving, using the first beam, one or more uplink messages from the one or more UEs. In some examples, to support communicating with the one or more UEs, the transmission component 1025 may be configured as or otherwise support a means for transmitting, using the first beam, one or more downlink messages to the one or more UEs. In some examples, to support communicating with the one or more UEs, the communications component 1035 may be configured as or otherwise support a means for any combination thereof.

Figure 11:
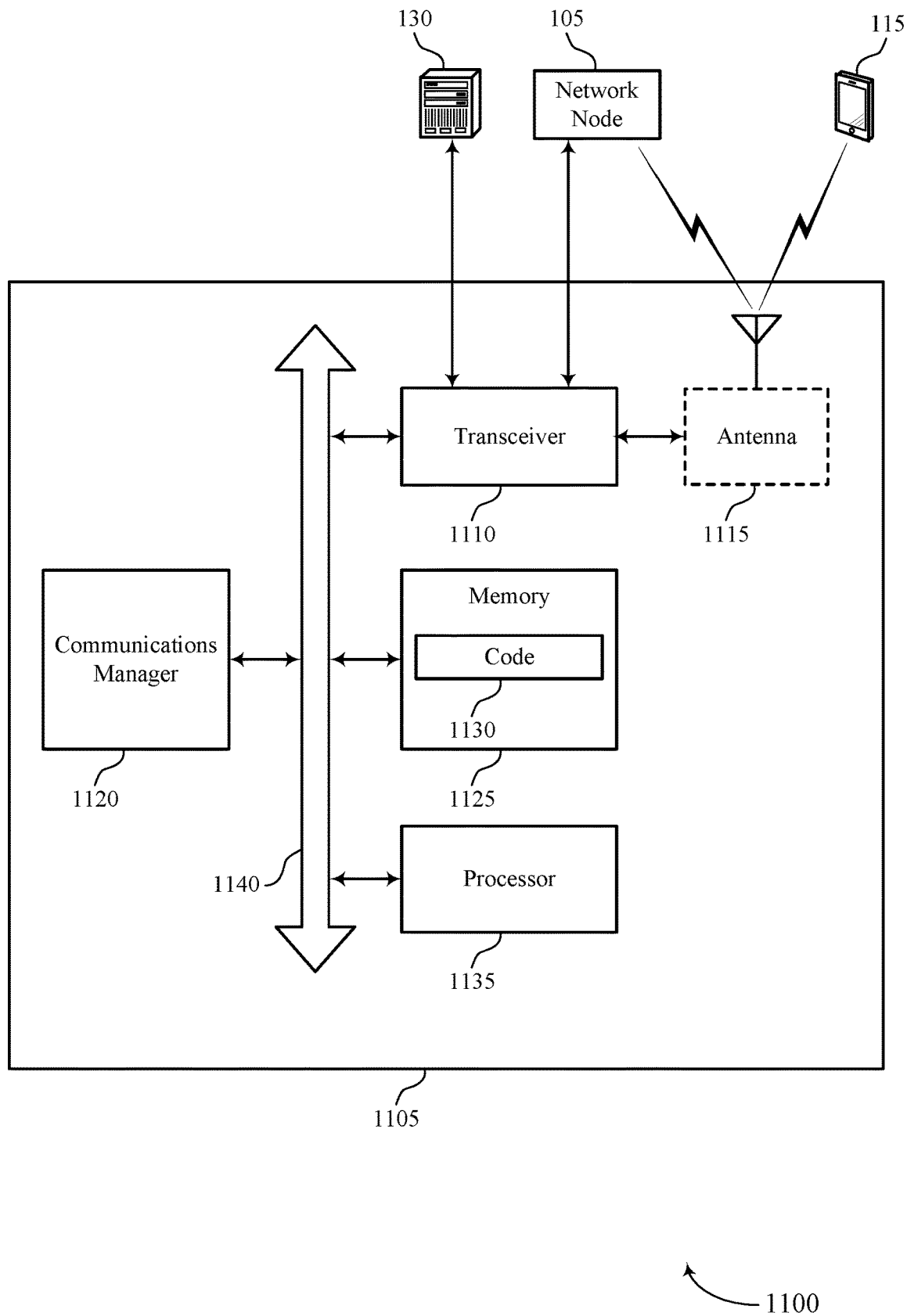
FIG. 11 shows a diagram of a system including a device that supports beam management using a dedicated physical layer channel in accordance with one or more aspects of the present disclosure.

FIG. 11 shows a diagram of a system 1100 including a device 1105 that supports beam management using a dedicated physical layer channel in accordance with one or more aspects of the present disclosure. The device 1105 may be an example of or include the components of a device 805, a device 905, or a network node 105 as described herein. The device 1105 may communicate with one or more network nodes 105, one or more UEs 115, or any combination thereof, which may include communications over one or more wired interfaces, over one or more wireless interfaces, or any combination thereof. The device 1105 may include components that support outputting and obtaining communications, such as a communications manager 1120, a transceiver 1110, an antenna 1115, a memory 1125, code 1130, and a processor 1135. These components may be in electronic communication or otherwise coupled (e.g., operatively, communicatively, functionally, electronically, electrically) via one or more buses (e.g., a bus 1140).

The transceiver 1110 may support bi-directional communications via wired links, wireless links, or both as described herein. In some examples, the transceiver 1110 may include a wired transceiver and may communicate bi-directionally with another wired transceiver. Additionally, or alternatively, in some examples, the transceiver 1110 may include a wireless transceiver and may communicate bi-directionally with another wireless transceiver. In some examples, the device 1105 may include one or more antennas 1115, which may be capable of transmitting or receiving wireless transmissions (e.g., concurrently). The transceiver 1110 may also include a modem to modulate signals, to provide the modulated signals for transmission (e.g., by one or more antennas 1115, by a wired transmitter), to receive modulated signals (e.g., from one or more antennas 1115, from a wired receiver), and to demodulate signals. In some implementations, the transceiver 1110 may include one or more interfaces, such as one or more interfaces coupled with the one or more antennas 1115 that are configured to support various receiving or obtaining operations, or one or more interfaces coupled with the one or more antennas 1115 that are configured to support various transmitting or outputting operations, or a combination thereof. In some implementations, the transceiver 1110 may include or be configured for coupling with one or more processors or memory components that are operable to perform or support operations based on received or obtained information or signals, or to generate information or other signals for transmission or other outputting, or any combination thereof. In some implementations, the transceiver 1110, or the transceiver 1110 and the one or more antennas 1115, or the transceiver 1110 and the one or more antennas 1115 and one or more processors or memory components (for example, the processor 1135, or the memory 1125, or both), may be included in a chip or chip assembly that is installed in the device 1105. The transceiver 1110, or the transceiver 1110 and one or more antennas 1115 or wired interfaces, where applicable, may be an example of a transmitter 815, a transmitter 915, a receiver 810, a receiver 910, or any combination thereof or component thereof, as described herein. In some examples, the transceiver may be operable to support communications via one or more communications links (e.g., a communication link 125, a backhaul communication link 120, a midhaul communication link 162, a fronthaul communication link 168).

The memory 1125 may include RAM and ROM. The memory 1125 may store computer-readable, computer-executable code 1130 including instructions that, when executed by the processor 1135, cause the device 1105 to perform various functions described herein. The code 1130 may be stored in a non-transitory computer-readable medium such as system memory or another type of memory. In some cases, the code 1130 may not be directly executable by the processor 1135 but may cause a computer (e.g., when compiled and executed) to perform functions described herein. In some cases, the memory 1125 may contain, among other things, a BIOS which may control basic hardware or software operation such as the interaction with peripheral components or devices.

The processor 1135 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1135 may be configured to operate a memory array using a memory controller. In some other cases, a memory controller may be integrated into the processor 1135. The processor 1135 may be configured to execute computer-readable instructions stored in a memory (e.g., the memory 1125) to cause the device 1105 to perform various functions (e.g., functions or tasks supporting beam management using a dedicated physical layer channel). For example, the device 1105 or a component of the device 1105 may include a processor 1135 and memory 1125 coupled with the processor 1135, the processor 1135 and memory 1125 configured to perform various functions described herein. The processor 1135 may be an example of a cloud-computing platform (e.g., one or more physical nodes and supporting software such as operating systems, virtual machines, or container instances) that may host the functions (e.g., by executing code 1130) to perform the functions of the device 1105. The processor 1135 may be any one or more suitable processors capable of executing scripts or instructions of one or more software programs stored in the device 1105 (such as within the memory 1125). In some implementations, the processor 1135 may be a component of a processing system. A processing system may generally refer to a system or series of machines or components that receives inputs and processes the inputs to produce a set of outputs (which may be passed to other systems or components of, for example, the device 1105). For example, a processing system of the device 1105 may refer to a system including the various other components or subcomponents of the device 1105, such as the processor 1135, or the transceiver 1110, or the communications manager 1120, or other components or combinations of components of the device 1105. The processing system of the device 1105 may interface with other components of the device 1105, and may process information received from other components (such as inputs or signals) or output information to other components. For example, a chip or modem of the device 1105 may include a processing system and an interface to output information, or to obtain information, or both. The interface may be implemented as or otherwise include a first interface configured to output information and a second interface configured to obtain information. In some implementations, the first interface may refer to an interface between the processing system of the chip or modem and a transmitter, such that the device 1105 may transmit information output from the chip or modem. In some implementations, the second interface may refer to an interface between the processing system of the chip or modem and a receiver, such that the device 1105 may obtain information or signal inputs, and the information may be passed to the processing system. A person having ordinary skill in the art will readily recognize that the first interface also may obtain information or signal inputs, and the second interface also may output information or signal outputs.

In some examples, a bus 1140 may support communications of (e.g., within) a protocol layer of a protocol stack. In some examples, a bus 1140 may support communications associated with a logical channel of a protocol stack (e.g., between protocol layers of a protocol stack), which may include communications performed within a component of the device 1105, or between different components of the device 1105 that may be co-located or located in different locations (e.g., where the device 1105 may refer to a system in which one or more of the communications manager 1120, the transceiver 1110, the memory 1125, the code 1130, and the processor 1135 may be located in one of the different components or divided between different components).

In some examples, the communications manager 1120 may manage aspects of communications with a core network 130 (e.g., via one or more wired or wireless backhaul links). For example, the communications manager 1120 may manage the transfer of data communications for client devices, such as one or more UEs 115. In some examples, the communications manager 1120 may manage communications with other network nodes 105, and may include a controller or scheduler for controlling communications with UEs 115 in cooperation with other network nodes 105. In some examples, the communications manager 1120 may support an X2 interface within an LTE/LTE-A wireless communications network technology to provide communication between network nodes 105.

The communications manager 1120 may support wireless communication at a network node in accordance with examples as disclosed herein. For example, the communications manager 1120 may be configured as or otherwise support a means for transmitting, via a first physical layer channel, a control message identifying a configuration for a second physical layer channel dedicated to beam management information. The communications manager 1120 may be configured as or otherwise support a means for transmitting, via the second physical layer channel dedicated to the beam management information according to the configuration, an indication of one or more beam management parameters for one or more UEs to use to identify a first beam for communications with the network node. The communications manager 1120 may be configured as or otherwise support a means for communicating with the one or more UEs based on transmitting the indication of the one or more beam management parameters transmitted via the second physical layer channel dedicated to the beam management information.

By including or configuring the communications manager 1120 in accordance with examples as described herein, the device 1105 may support techniques for reduced latency, improved user experience related to reduced processing, and reduced power consumption.

In some examples, the communications manager 1120 may be configured to perform various operations (e.g., receiving, obtaining, monitoring, outputting, transmitting) using or otherwise in cooperation with the transceiver 1110, the one or more antennas 1115 (e.g., where applicable), or any combination thereof. Although the communications manager 1120 is illustrated as a separate component, in some examples, one or more functions described with reference to the communications manager 1120 may be supported by or performed by the processor 1135, the memory 1125, the code 1130, the transceiver 1110, or any combination thereof. For example, the code 1130 may include instructions executable by the processor 1135 to cause the device 1105 to perform various aspects of beam management using a dedicated physical layer channel as described herein, or the processor 1135 and the memory 1125 may be otherwise configured to perform or support such operations.

Figure 12:
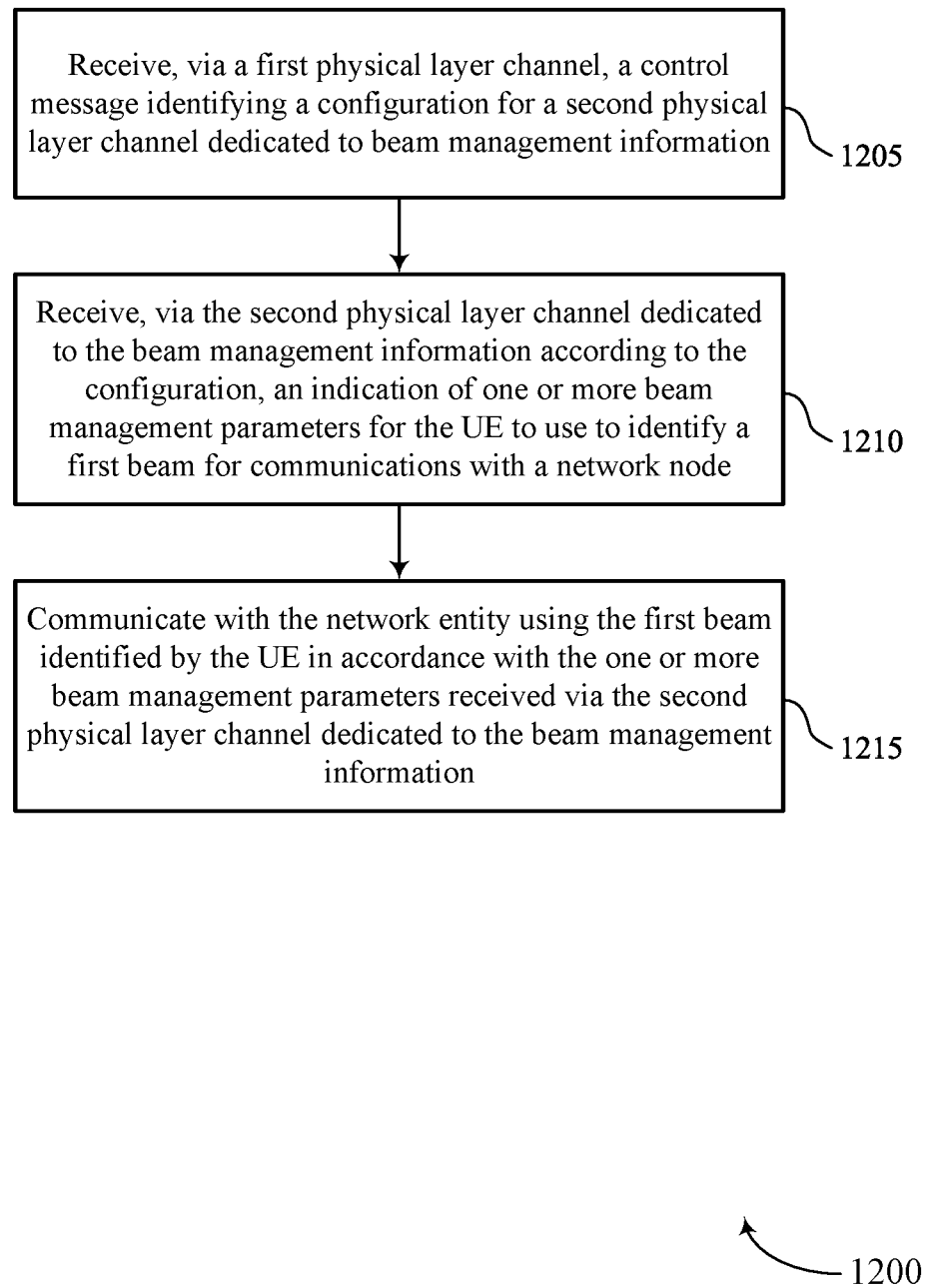
FIGS. 12 through 16 show flowcharts illustrating methods that support beam management using a dedicated physical layer channel in accordance with one or more aspects of the present disclosure.

FIG. 12 shows a flowchart illustrating a method 1200 that supports beam management using a dedicated physical layer channel in accordance with one or more aspects of the present disclosure. The operations of the method 1200 may be implemented by a UE or its components as described herein. For example, the operations of the method 1200 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 1205, the method may include receiving, via a first physical layer channel, a control message identifying a configuration for a second physical layer channel dedicated to beam management information. The operations of 1205 may be performed in accordance with examples as disclosed herein. In some examples, aspects of the operations of 1205 may be performed by a reception component 625 as described with reference to FIG. 6.

At 1210, the method may include receiving, via the second physical layer channel dedicated to the beam management information according to the configuration, an indication of one or more beam management parameters for the UE to use to identify a first beam for communications with a network node. The operations of 1210 may be performed in accordance with examples as disclosed herein. In some examples, aspects of the operations of 1210 may be performed by a beam parameters reception component 630 as described with reference to FIG. 6.

At 1215, the method may include communicating with the network node using the first beam identified by the UE in accordance with the one or more beam management parameters received via the second physical layer channel dedicated to the beam management information. The operations of 1215 may be performed in accordance with examples as disclosed herein. In some examples, aspects of the operations of 1215 may be performed by a beamformed communications component 635 as described with reference to FIG. 6.

Figure 13:
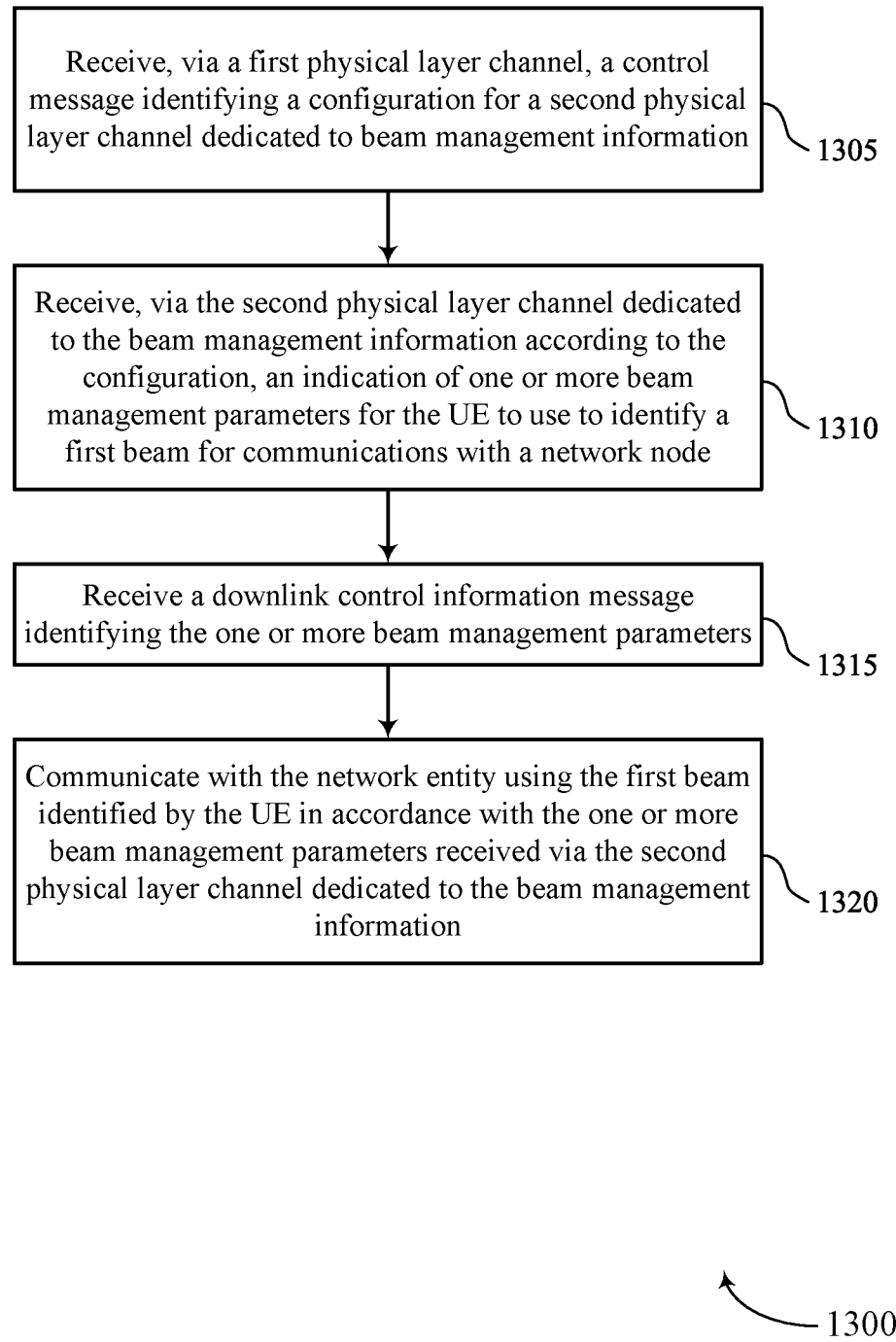

FIG. 13 shows a flowchart illustrating a method 1300 that supports beam management using a dedicated physical layer channel in accordance with one or more aspects of the present disclosure. The operations of the method 1300 may be implemented by a UE or its components as described herein. For example, the operations of the method 1300 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 1305, the method may include receiving, via a first physical layer channel, a control message identifying a configuration for a second physical layer channel dedicated to beam management information. The operations of 1305 may be performed in accordance with examples as disclosed herein. In some examples, aspects of the operations of 1305 may be performed by a reception component 625 as described with reference to FIG. 6.

At 1310, the method may include receiving, via the second physical layer channel dedicated to the beam management information according to the configuration, an indication of one or more beam management parameters for the UE to use to identify a first beam for communications with a network node. The operations of 1310 may be performed in accordance with examples as disclosed herein. In some examples, aspects of the operations of 1310 may be performed by a beam parameters reception component 630 as described with reference to FIG. 6.

At 1315, the method may include receiving a downlink control information message identifying the one or more beam management parameters. The operations of 1315 may be performed in accordance with examples as disclosed herein. In some examples, aspects of the operations of 1315 may be performed by a reception component 625 as described with reference to FIG. 6.

At 1320, the method may include communicating with the network node using the first beam identified by the UE in accordance with the one or more beam management parameters received via the second physical layer channel dedicated to the beam management information. The operations of 1320 may be performed in accordance with examples as disclosed herein. In some examples, aspects of the operations of 1320 may be performed by a beamformed communications component 635 as described with reference to FIG. 6.

Figure 14:
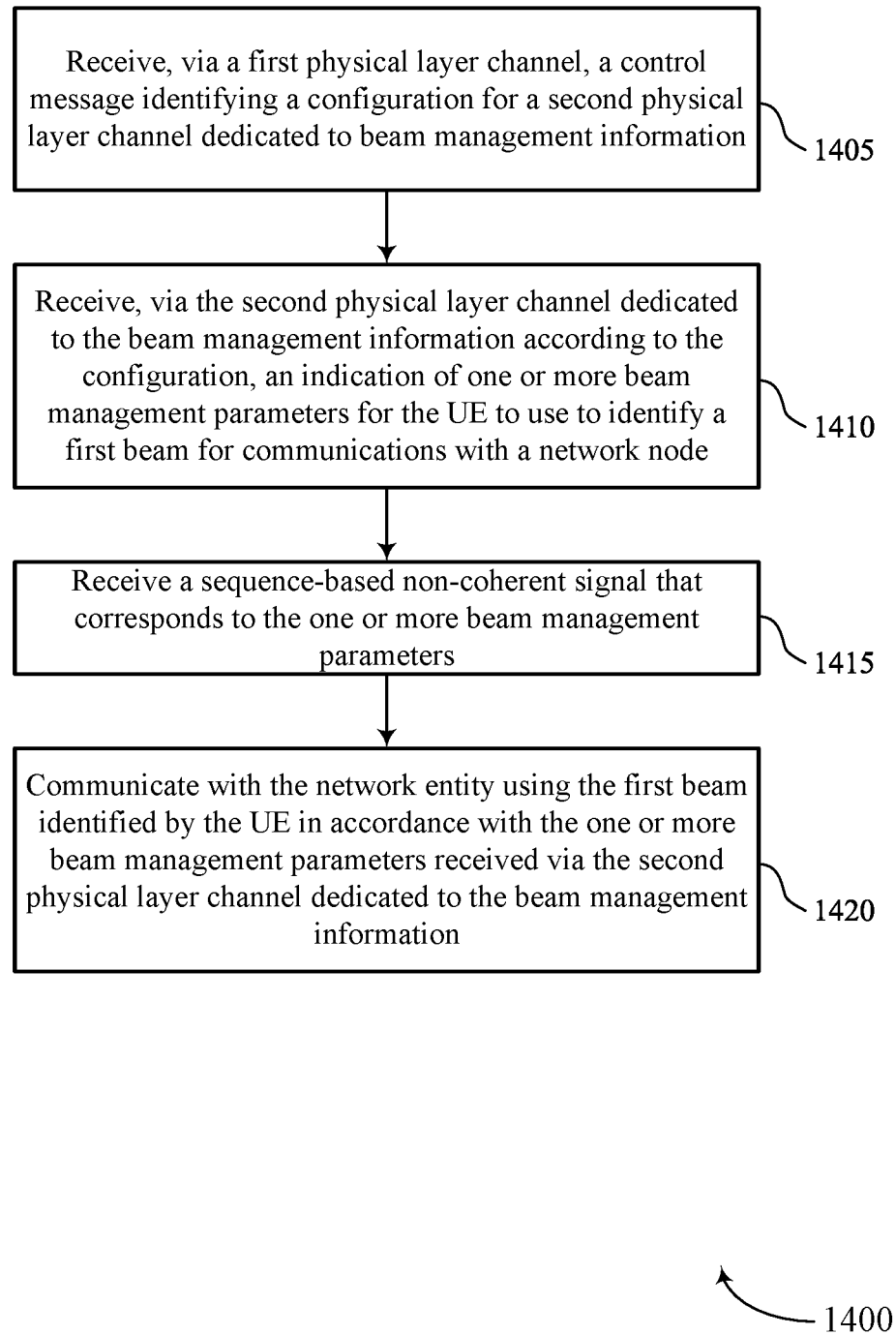

FIG. 14 shows a flowchart illustrating a method 1400 that supports beam management using a dedicated physical layer channel in accordance with one or more aspects of the present disclosure. The operations of the method 1400 may be implemented by a UE or its components as described herein. For example, the operations of the method 1400 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 1405, the method may include receiving, via a first physical layer channel, a control message identifying a configuration for a second physical layer channel dedicated to beam management information. The operations of 1405 may be performed in accordance with examples as disclosed herein. In some examples, aspects of the operations of 1405 may be performed by a reception component 625 as described with reference to FIG. 6.

At 1410, the method may include receiving, via the second physical layer channel dedicated to the beam management information according to the configuration, an indication of one or more beam management parameters for the UE to use to identify a first beam for communications with a network node. The operations of 1410 may be performed in accordance with examples as disclosed herein. In some examples, aspects of the operations of 1410 may be performed by a beam parameters reception component 630 as described with reference to FIG. 6.

At 1415, the method may include receiving a sequence-based non-coherent signal that corresponds to the one or more beam management parameters. The operations of 1415 may be performed in accordance with examples as disclosed herein. In some examples, aspects of the operations of 1415 may be performed by a reception component 625 as described with reference to FIG. 6.

At 1420, the method may include communicating with the network node using the first beam identified by the UE in accordance with the one or more beam management parameters received via the second physical layer channel dedicated to the beam management information. The operations of 1420 may be performed in accordance with examples as disclosed herein. In some examples, aspects of the operations of 1420 may be performed by a beamformed communications component 635 as described with reference to FIG. 6.

Figure 15:
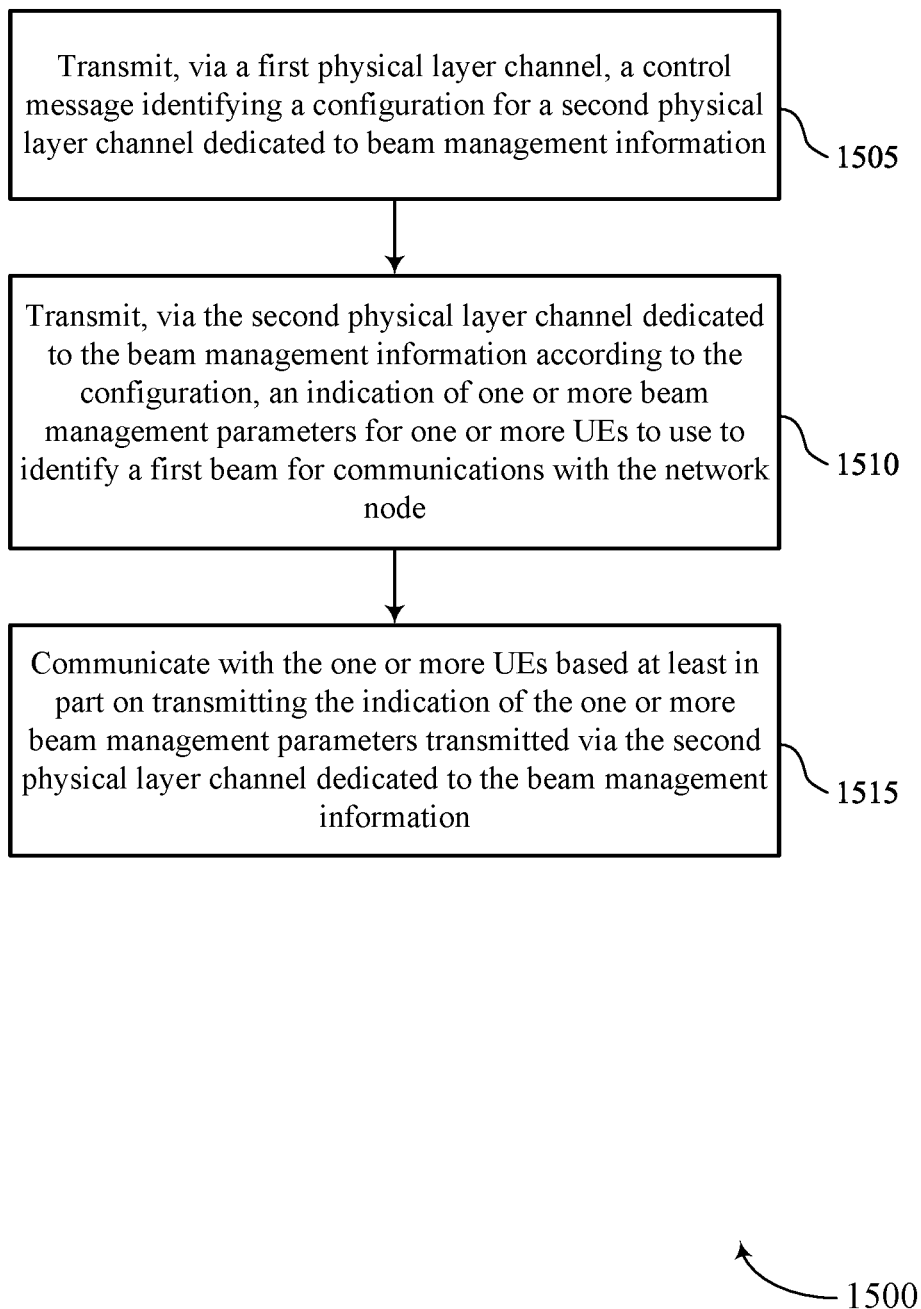

FIG. 15 shows a flowchart illustrating a method 1500 that supports beam management using a dedicated physical layer channel in accordance with one or more aspects of the present disclosure. The operations of the method 1500 may be implemented by a network node or its components as described herein. For example, the operations of the method 1500 may be performed by a network node as described with reference to FIGS. 1 through 3 and 8 through 11. In some examples, a network node may execute a set of instructions to control the functional elements of the network node to perform the described functions. Additionally, or alternatively, the network node may perform aspects of the described functions using special-purpose hardware.

At 1505, the method may include transmitting, via a first physical layer channel, a control message identifying a configuration for a second physical layer channel dedicated to beam management information. The operations of 1505 may be performed in accordance with examples as disclosed herein. In some examples, aspects of the operations of 1505 may be performed by a transmission component 1025 as described with reference to FIG. 10.

At 1510, the method may include transmitting, via the second physical layer channel dedicated to the beam management information according to the configuration, an indication of one or more beam management parameters for one or more UEs to use to identify a first beam for communications with the network node. The operations of 1510 may be performed in accordance with examples as disclosed herein. In some examples, aspects of the operations of 1510 may be performed by a beam parameters transmission component 1030 as described with reference to FIG. 10.

At 1515, the method may include communicating with the one or more UEs based on transmitting the indication of the one or more beam management parameters transmitted via the second physical layer channel dedicated to the beam management information. The operations of 1515 may be performed in accordance with examples as disclosed herein. In some examples, aspects of the operations of 1515 may be performed by a communications component 1035 as described with reference to FIG. 10.

Figure 16:
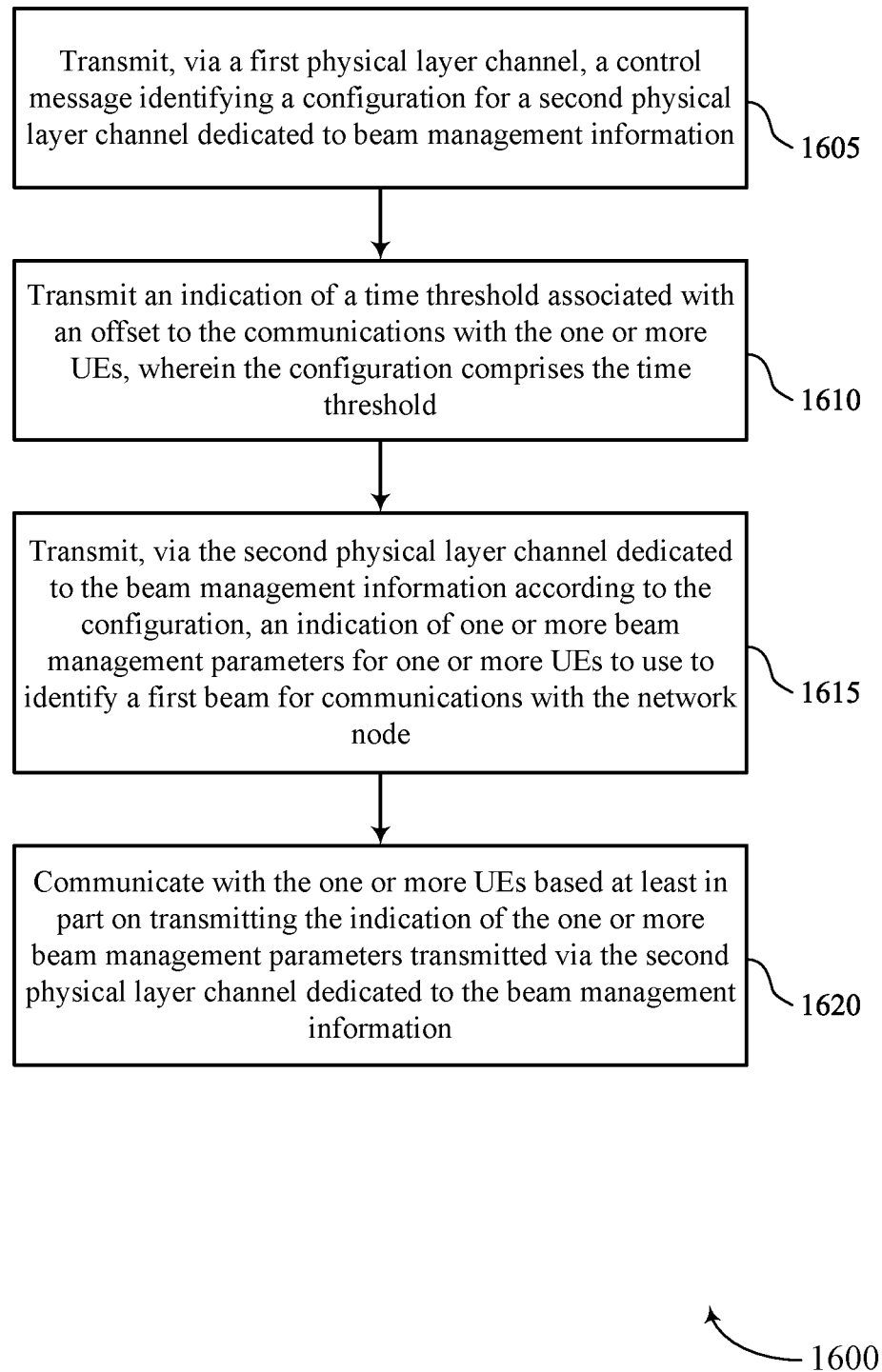

FIG. 16 shows a flowchart illustrating a method 1600 that supports beam management using a dedicated physical layer channel in accordance with one or more aspects of the present disclosure. The operations of the method 1600 may be implemented by a network node or its components as described herein. For example, the operations of the method 1600 may be performed by a network node as described with reference to FIGS. 1 through 3 and 8 through 11. In some examples, a network node may execute a set of instructions to control the functional elements of the network node to perform the described functions. Additionally, or alternatively, the network node may perform aspects of the described functions using special-purpose hardware.

At 1605, the method may include transmitting, via a first physical layer channel, a control message identifying a configuration for a second physical layer channel dedicated to beam management information. The operations of 1605 may be performed in accordance with examples as disclosed herein. In some examples, aspects of the operations of 1605 may be performed by a transmission component 1025 as described with reference to FIG. 10.

At 1610, the method may include transmitting an indication of a time threshold associated with an offset to the communications with the one or more UEs, where the configuration includes the time threshold. The operations of 1610 may be performed in accordance with examples as disclosed herein. In some examples, aspects of the operations of 1610 may be performed by a transmission component 1025 as described with reference to FIG. 10.

At 1615, the method may include transmitting, via the second physical layer channel dedicated to the beam management information according to the configuration, an indication of one or more beam management parameters for one or more UEs to use to identify a first beam for communications with the network node. The operations of 1615 may be performed in accordance with examples as disclosed herein. In some examples, aspects of the operations of 1615 may be performed by a beam parameters transmission component 1030 as described with reference to FIG. 10.

At 1620, the method may include communicating with the one or more UEs based on transmitting the indication of the one or more beam management parameters transmitted via the second physical layer channel dedicated to the beam management information. The operations of 1620 may be performed in accordance with examples as disclosed herein. In some examples, aspects of the operations of 1620 may be performed by a communications component 1035 as described with reference to FIG. 10.

The following provides an overview of aspects of the present disclosure:

Aspect 1: A method for wireless communication at a UE, comprising: receiving, via a first physical layer channel, a control message identifying a configuration for a second physical layer channel dedicated to beam management information; receiving, via the second physical layer channel dedicated to the beam management information according to the configuration, an indication of one or more beam management parameters for the UE to use to identify a first beam for communications with a network entity; and communicating with the network entity using the first beam identified by the UE in accordance with the one or more beam management parameters received via the second physical layer channel dedicated to the beam management information.

Aspect 2: The method of aspect 1, wherein receiving the indication of the one or more beam management parameters comprises: receiving a downlink control information message identifying the one or more beam management parameters.

Aspect 3: The method of aspect 2, wherein the downlink control information message is of a first downlink control information format type for beam management and shares a control resource set or a synchronization signal set with at least a second downlink control information format type different from the first downlink control information format type.

Aspect 4: The method of aspect 2, wherein the downlink control information message is received via a control resource set or a synchronization signal set dedicated to communicating a first downlink control information format type for beam management.

Aspect 5: The method of aspect 1, wherein receiving the indication of the one or more beam management parameters comprises: receiving a sequence-based non-coherent signal that corresponds to the one or more beam management parameters.

Aspect 6: The method of aspect 5, wherein the sequence-based non-coherent signal is associated with different reference signal properties, is received according to ON/OFF keying, corresponds to a type of index modulation, or any combination thereof.

Aspect 7: The method of any of aspects 1 through 8, wherein the configuration for the second physical layer channel dedicated to the beam management information comprises: an indication of a periodic set of time-frequency resources for the second physical layer channel; an indication of a semi-persistently scheduled set of time-frequency resources for the second physical layer channel, wherein the UE receives the indication of the one or more beam management parameters via the second physical layer channel in response to a grant identifying resources of the semi-persistently scheduled set of time-frequency resources; a grant of downlink time-frequency resources for the UE to use to receive the second physical layer channel; a grant of downlink time-frequency resources for the UE to use to receive the second physical layer channel responsive to a request for the one or more beam management parameters transmitted to the network entity by the UE; or any combination thereof.

Aspect 9: The method of any of aspects 1 through 7, further comprising: transmitting a feedback message identifying that the UE has successfully received the indication of the one or more beam management parameters.

Aspect 10: The method of any of aspects 1 through 9, wherein receiving the control message identifying the configuration comprises: receiving an indication of a time threshold associated with an offset to the communications with the network entity, wherein the configuration comprises the time threshold.

Aspect 11: The method of aspect 10, further comprising: transmitting a receiver capability of the UE, wherein the time threshold is received at least in part in response to the transmitted receiver capability.

Aspect 12: The method of any of aspects 1 through 11, further comprising: receiving, prior to receiving the control message, a message indicating a second beam for receiving the indication of the one or more beam management parameters.

Aspect 13: The method of any of aspects 1 through 12, wherein the one or more beam management parameters comprise a transmission configuration indicator state corresponding to one or more third physical layer channels, a spatial relation corresponding to the one or more third physical layer channels, a first flag activating or deactivating the transmission configuration indicator state, a trigger for an aperiodic reference signal transmission, a second flag activating or deactivating a semi-persistent reference signal transmission, or any combination thereof.

Aspect 14: The method of any of aspects 1 through 13, wherein the communicating with the network entity comprises: transmitting, using the first beam, one or more uplink messages to the network entity; receiving, using the first beam, one or more downlink messages from the network entity; or any combination thereof.

Aspect 15: A method for wireless communication at a network entity, comprising: transmitting, via a first physical layer channel, a control message identifying a configuration for a second physical layer channel dedicated to beam management information; transmitting, via the second physical layer channel dedicated to the beam management information according to the configuration, an indication of one or more beam management parameters for one or more user equipments (UEs) to use to identify a first beam for communications with the network entity; and communicating with the one or more UEs based at least in part on transmitting the indication of the one or more beam management parameters transmitted via the second physical layer channel dedicated to the beam management information.

Aspect 16: The method of aspect 15, wherein transmitting the control message identifying the configuration comprises: transmitting an indication of a time threshold associated with an offset to the communications with the one or more UEs, wherein the configuration comprises the time threshold.

Aspect 17: The method of aspect 16, wherein the time threshold is based at least in part on a capability of a receiver of the one or more UEs, a third physical layer channel corresponding to the communications, a subcarrier spacing of the indication, a type of signaling carrying the indication, or any combination thereof.

Aspect 18: The method of any of aspects 15 through 17, wherein transmitting the indication of the one or more beam management parameters comprises: transmitting a downlink control information message identifying the one or more beam management parameters.

Aspect 19: The method of aspect 18, wherein the downlink control information message is of a first downlink control information format type for beam management and shares a control resource set or a synchronization signal set with at least a second downlink control information format type different from the first downlink control information format type.

Aspect 20: The method of aspect 18, wherein the downlink control information message is transmitted via a control resource set or a synchronization signal set dedicated to communicating a first downlink control information format type for beam management.

Aspect 21: The method of aspect 15, wherein transmitting the indication of the one or more beam management parameters comprises: transmitting a sequence-based non-coherent signal that corresponds to the one or more beam management parameters.

Aspect 22: The method of aspect 21, wherein the sequence-based non-coherent signal is associated with different reference signal properties, is transmitted according to ON/OFF keying, corresponds to a type of index modulation, or any combination thereof.

Aspect 23: The method of any of aspects 15 through 24, wherein the configuration for the second physical layer channel dedicated to the beam management information comprises: an indication of a periodic set of time-frequency resources for the second physical layer channel; an indication of a semi-persistently scheduled set of time-frequency resources for the second physical layer channel, wherein the network entity transmits the indication of the one or more beam management parameters via the second physical layer channel based at least in part on transmitting a grant identifying resources of the semi-persistently scheduled set of time-frequency resources; a grant of downlink time-frequency resources for the one or more UEs to use to receive the second physical layer channel; a grant of downlink time-frequency resources for the one or more UEs to use to receive the second physical layer channel responsive to a request for the one or more beam management parameters received at the network entity from the one or more UEs; or any combination thereof.

Aspect 25: The method of any of aspects 15 through 23, further comprising: receiving a feedback message identifying that the one or more UEs have successfully received the indication of the one or more beam management parameters.

Aspect 26: The method of any of aspects 15 through 25, further comprising: transmitting, prior to transmitting the control message, a message for the one or more UEs to use to identify a second beam for receiving the indication of the one or more beam management parameters.

Aspect 27: The method of any of aspects 15 through 26, wherein the one or more beam management parameters comprise a transmission configuration indicator state corresponding to one or more third physical layer channels, a spatial relation corresponding to the one or more third physical layer channels, a first flag activating or deactivating the transmission configuration indicator state, a trigger for an aperiodic reference signal transmission, a second flag activating or deactivating a semi-persistent reference signal transmission, or any combination thereof.

Aspect 28: The method of any of aspects 15 through 27, wherein the communicating with the one or more UEs comprises: receiving, using the first beam, one or more uplink messages from the one or more UEs; transmitting, using the first beam, one or more downlink messages to the one or more UEs; or any combination thereof.

Aspect 29: An apparatus for wireless communication at a UE, comprising a processor; memory coupled with the processor; and instructions stored in the memory and executable by the processor to cause the apparatus to perform a method of any of aspects 1 through 14.

Aspect 30: An apparatus for wireless communication at a UE, comprising at least one means for performing a method of any of aspects 1 through 14.

Aspect 31: A non-transitory computer-readable medium storing code for wireless communication at a UE, the code comprising instructions executable by a processor to perform a method of any of aspects 1 through 14.

Aspect 32: An apparatus for wireless communication at a network entity, comprising a processor; memory coupled with the processor; and instructions stored in the memory and executable by the processor to cause the apparatus to perform a method of any of aspects 15 through 28.

Aspect 33: An apparatus for wireless communication at a network entity, comprising at least one means for performing a method of any of aspects 15 through 28.

Aspect 34: A non-transitory computer-readable medium storing code for wireless communication at a network entity, the code comprising instructions executable by a processor to perform a method of any of aspects 15 through 28.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a user equipment (UE), comprising:
   a processor;
   memory coupled with the processor; and
   instructions stored in the memory and executable by the processor to cause the apparatus to:
      receive, via a first physical layer channel, a control message identifying a configuration for a second physical layer channel dedicated to beam management information;
      receive, via the second physical layer channel dedicated to the beam management information according to the configuration, an indication of one or more beam management parameters for the UE to use to identify a first beam for communications with a network node; and
      communicate with the network node using the first beam identified by the UE in accordance with the one or more beam management parameters received via the second physical layer channel dedicated to the beam management information.

2. The apparatus of claim 1, wherein the instructions to receive the indication of the one or more beam management parameters are executable by the processor to cause the apparatus to:
   receive a downlink control information message identifying the one or more beam management parameters.

3. The apparatus of claim 2, wherein the downlink control information message is of a first downlink control information format type for beam management and shares a control resource set or a synchronization signal set with at least a second downlink control information format type different from the first downlink control information format type.

4. The apparatus of claim 2, wherein the downlink control information message is received via a control resource set or a synchronization signal set dedicated to communicating a first downlink control information format type for beam management.

5. The apparatus of claim 1, wherein the instructions to receive the indication of the one or more beam management parameters are executable by the processor to cause the apparatus to:
   receive a sequence-based non-coherent signal that corresponds to the one or more beam management parameters.

6. The apparatus of claim 5, wherein the sequence-based non-coherent signal is associated with different reference signal properties, is received according to ON/OFF keying, corresponds to a type of index modulation, or any combination thereof.

7. The apparatus of claim 1, wherein the configuration for the second physical layer channel dedicated to the beam management information comprises:
   an indication of a periodic set of time-frequency resources for the second physical layer channel;
   an indication of a semi-persistently schedule set of time-frequency resources for the second physical layer channel, wherein the UE receives the indication of the one or more beam management parameters via the second physical layer channel in response to a grant identifying resources of the semi-persistently scheduled set of time-frequency resources;
   a grant of downlink time-frequency resources for the UE to use to receive the second physical layer channel;
   a grant of downlink time-frequency resources for the UE to use to receive the second physical layer channel responsive to a request for the one or more beam management parameters transmitted to the network node by the UE; or
   any combination thereof.

8. The apparatus of claim 1, wherein the instructions are further executable by the processor to cause the apparatus to:
   transmit a feedback message identifying that the UE has successfully received the indication of the one or more beam management parameters.

9. The apparatus of claim 1, wherein the instructions to receive the control message identifying the configuration are executable by the processor to cause the apparatus to:
   receive an indication of a time threshold associated with an offset to the communications with the network node, wherein the configuration comprises the time threshold.

10. The apparatus of claim 9, wherein the instructions are further executable by the processor to cause the apparatus to:
    transmit a receiver capability of the UE, wherein the time threshold is received at least in part in response to the transmitted receiver capability.

11. The apparatus of claim 1, wherein the instructions are further executable by the processor to cause the apparatus to:
    receive, prior to receiving the control message, a message indicating a second beam for receiving the indication of the one or more beam management parameters.

12. The apparatus of claim 1, wherein the one or more beam management parameters comprise a transmission configuration indicator state corresponding to one or more third physical layer channels, a spatial relation corresponding to the one or more third physical layer channels, a first flag activating or deactivating the transmission configuration indicator state, a trigger for an aperiodic reference signal transmission, a second flag activating or deactivating a semi-persistent reference signal transmission, or any combination thereof.

13. The apparatus of claim 1, wherein the instructions to communicating with the network node are executable by the processor to cause the apparatus to:
    transmit, using the first beam, one or more uplink messages to the network node;
    receive, using the first beam, one or more downlink messages from the network node; or
    any combination thereof.

14. An apparatus for wireless communication at a network node, comprising:
a processor;
memory coupled with the processor; and
instructions stored in the memory and executable by the processor to cause the apparatus to:
transmit, via a first physical layer channel, a control message identifying a configuration for a second physical layer channel dedicated to beam management information;
transmit, via the second physical layer channel dedicated to the beam management information according to the configuration, an indication of one or more beam management parameters for one or more user equipments (UEs) to use to identify a first beam for communications with the network node; and
communicate with the one or more UEs based at least in part on transmitting the indication of the one or more beam management parameters transmitted via the second physical layer channel dedicated to the beam management information.

15. The apparatus of claim 14, wherein the instructions to transmit the control message identifying the configuration are executable by the processor to cause the apparatus to:
transmit an indication of a time threshold associated with an offset to the communications with the one or more UEs, wherein the configuration comprises the time threshold.

16. The apparatus of claim 15, wherein the time threshold is based at least in part on a capability of a receiver of the one or more UEs, a third physical layer channel corresponding to the communications, a subcarrier spacing of the indication, a type of signaling carrying the indication, or any combination thereof.

17. The apparatus of claim 14, wherein the instructions to transmit the indication of the one or more beam management parameters are executable by the processor to cause the apparatus to:
transmit a downlink control information message identifying the one or more beam management parameters.

18. The apparatus of claim 17, wherein the downlink control information message is of a first downlink control information format type for beam management and shares a control resource set or a synchronization signal set with at least a second downlink control information format type different from the first downlink control information format type.

19. The apparatus of claim 17, wherein the downlink control information message is transmitted via a control resource set or a synchronization signal set dedicated to communicating a first downlink control information format type for beam management.

20. The apparatus of claim 14, wherein the instructions to transmit the indication of the one or more beam management parameters are executable by the processor to cause the apparatus to:
transmit a sequence-based non-coherent signal that corresponds to the one or more beam management parameters.

21. The apparatus of claim 20, wherein the sequence-based non-coherent signal is associated with different reference signal properties, is transmitted according to ON/OFF keying, corresponds to a type of index modulation, or any combination thereof.

22. The apparatus of claim 14, wherein the configuration for the second physical layer channel dedicated to the beam management information comprises:
an indication of a periodic set of time-frequency resources for the second physical layer channel;
an indication of a semi-persistently scheduled set of time-frequency resources for the second physical layer channel, wherein the network node transmits the indication of the one or more beam management parameters via the second physical layer channel based at least in part on transmitting a grant identifying resources of the semi-persistently scheduled set of time-frequency resources;
a grant of downlink time-frequency resources for the one or more UEs to use to receive the second physical layer channel;
a grant of downlink time-frequency resources for the one or more UEs to use to receive the second physical layer channel responsive to a request for the one or more beam management parameters received at the network node from the one or more UEs; or
any combination thereof.

23. The apparatus of claim 14, wherein the instructions are further executable by the processor to cause the apparatus to:
receive a feedback message identifying that the one or more UEs have successfully received the indication of the one or more beam management parameters.

24. The apparatus of claim 14, wherein the instructions are further executable by the processor to cause the apparatus to:
transmit, prior to transmitting the control message, a message for the one or more UEs to use to identify a second beam for receiving the indication of the one or more beam management parameters.

25. The apparatus of claim 14, wherein the one or more beam management parameters comprise a transmission configuration indicator state corresponding to one or more third physical layer channels, a spatial relation corresponding to the one or more third physical layer channels, a first flag activating or deactivating the transmission configuration indicator state, a trigger for an aperiodic reference signal transmission, a second flag activating or deactivating a semi-persistent reference signal transmission, or any combination thereof.

26. The apparatus of claim 14, wherein the instructions to communicating with the one or more UEs are executable by the processor to cause the apparatus to:
receive, using the first beam, one or more uplink messages from the one or more UEs;
transmit, using the first beam, one or more downlink messages to the one or more UEs; or
any combination thereof.

27. A method for wireless communication at a user equipment (UE), comprising:
receiving, via a first physical layer channel, a control message identifying a configuration for a second physical layer channel dedicated to beam management information;
receiving, via the second physical layer channel dedicated to the beam management information according to the configuration, an indication of one or more beam management parameters for the UE to use to identify a first beam for communications with a network node; and
communicating with the network node using the first beam identified by the UE in accordance with the one or more beam management parameters received via the second physical layer channel dedicated to the beam management information.

28. The method of claim 27, wherein receiving the indication of the one or more beam management parameters comprises:
receiving a downlink control information message identifying the one or more beam management parameters.

29. The method of claim 27, wherein receiving the indication of the one or more beam management parameters comprises:
receiving a sequence-based non-coherent signal that corresponds to the one or more beam management parameters.

30. A method for wireless communication at a network node, comprising:
transmitting, via a first physical layer channel, a control message identifying a configuration for a second physical layer channel dedicated to beam management information;
transmitting, via the second physical layer channel dedicated to the beam management information according to the configuration, an indication of one or more beam management parameters for one or more user equipments (UEs) to use to identify a first beam for communications with the network node; and
communicating with the one or more UEs based at least in part on transmitting the indication of the one or more beam management parameters transmitted via the second physical layer channel dedicated to the beam management information.

* * * * *